United States Patent
Duquette et al.

(10) Patent No.: US 9,445,486 B2
(45) Date of Patent: Sep. 13, 2016

(54) ENERGY DISSIPATIVE TUBES

(71) Applicant: Titeflex Corporation, Springfield, MA (US)

(72) Inventors: Scott Duquette, East Windsor, CT (US); Brian Coppola, Amherst, MA (US)

(73) Assignee: Titeflex Corporation, Springfield, MA (US)

( * ) Notice: Subject to any disclaimer, the term of this patent is extended or adjusted under 35 U.S.C. 154(b) by 0 days.

(21) Appl. No.: 14/971,278

(22) Filed: Dec. 16, 2015

(65) Prior Publication Data

US 2016/0105944 A1    Apr. 14, 2016

Related U.S. Application Data

(63) Continuation of application No. 12/828,769, filed on Jul. 1, 2010, now Pat. No. 9,249,904.

(60) Provisional application No. 61/235,910, filed on Aug. 21, 2009, provisional application No. 61/321,689, filed on Apr. 7, 2010.

(51) Int. Cl.
*F16L 9/14* (2006.01)
*F16L 11/12* (2006.01)
*H05F 3/00* (2006.01)
(Continued)

(52) U.S. Cl.
CPC ............... *H05F 3/00* (2013.01); *F16L 9/147* (2013.01); *F16L 19/041* (2013.01); *H02G 3/0468* (2013.01); *H02G 3/0481* (2013.01);
(Continued)

(58) Field of Classification Search
CPC .. F16L 11/1185; F16L 11/125; F16L 11/045; F16L 11/115; F16L 11/085
USPC ............... 138/121, 138, 139, 141, 137, 140; 428/35.9, 36.9
See application file for complete search history.

(56) References Cited

U.S. PATENT DOCUMENTS 1,223,864 A    4/1917    French
1,852,921 A    4/1932    Dreyer
(Continued)

FOREIGN PATENT DOCUMENTS

CA    2002644    5/1991
CA    2100241 A1    10/1992
(Continued)

OTHER PUBLICATIONS

Office Action from co-pending U.S. Appl. No. 12/828,847, mailed Jul. 12, 2012.
(Continued)

*Primary Examiner* — Patrick F Brinson
(74) *Attorney, Agent, or Firm* — Brian R. Landry; Saul Ewing LLP

(57) ABSTRACT

One aspect of the invention provides an energy dissipative tube including: a length of corrugated stainless steel tubing; a conductive resin layer adjacent to the outside of the tubing; and an insulative resin layer adjacent to the conductive layer. Another aspect of the invention provides an energy dissipative tube consisting of: a length of corrugated stainless steel tubing; a conductive thermoplastic polymer layer adjacent to the outside of the tubing, the conductive thermoplastic polymer layer having a volume resistivity of less than about $10^6$ ohm-cm; and an insulative resin layer adjacent to the conductive layer.

19 Claims, 16 Drawing Sheets

(51) Int. Cl.
 *F16L 9/147* (2006.01)
 *F16L 19/04* (2006.01)
 *H02G 3/04* (2006.01)
(52) U.S. Cl.
 CPC ..... *Y10T29/49117* (2015.01); *Y10T 29/49124* (2015.01); *Y10T 29/49826* (2015.01)

(56) References Cited

U.S. PATENT DOCUMENTS

| | | |
|---|---|---|
| 2,401,949 A | 9/1944 | Mariner |
| 2,449,369 A | 9/1948 | Doane |
| 2,511,896 A | 6/1950 | Bingley |
| 2,756,496 A | 7/1956 | Holland |
| 3,240,234 A | 3/1966 | Bond, Jr. |
| 3,457,359 A | 7/1969 | Soucy |
| 3,507,978 A | 4/1970 | Jachimowicz |
| 3,528,159 A | 9/1970 | Miles |
| 3,634,606 A | 1/1972 | Iyengar |
| 3,749,814 A | 7/1973 | Pratt |
| 3,828,112 A | 8/1974 | Johansen |
| 3,831,636 A | 8/1974 | Bittner |
| 4,049,904 A | 9/1977 | Hori |
| 4,103,320 A | 7/1978 | de Putter |
| 4,292,463 A | 9/1981 | Bow |
| 4,322,574 A | 3/1982 | Bow |
| 4,394,705 A | 7/1983 | Blachman |
| 4,675,780 A | 6/1987 | Barnes |
| 4,716,075 A | 12/1987 | Christ |
| 4,791,236 A | 12/1988 | Klein |
| 4,983,449 A | 1/1991 | Nee |
| 5,043,538 A | 8/1991 | Hughey, Jr. |
| 5,046,531 A | 9/1991 | Kanao |
| 5,061,823 A | 10/1991 | Carroll |
| 5,120,381 A | 6/1992 | Nee |
| 5,127,601 A | 7/1992 | Schroeder |
| 5,131,064 A | 7/1992 | Arroyo |
| 5,182,147 A | 1/1993 | Davis |
| 5,194,838 A | 3/1993 | Cobo |
| 5,222,770 A | 6/1993 | Helevirta |
| 5,225,265 A | 7/1993 | Prandy |
| 5,250,342 A | 10/1993 | Lang |
| 5,316,047 A | 5/1994 | Kanao |
| 5,357,049 A | 10/1994 | Plummer, III |
| 5,367,123 A | 11/1994 | Plummer, III |
| 5,370,921 A | 12/1994 | Cedarleaf |
| 5,391,838 A | 2/1995 | Plummer, III |
| 5,397,618 A | 3/1995 | Cedarleaf |
| 5,401,334 A | 3/1995 | O'Melia |
| 5,413,147 A | 5/1995 | Moreiras |
| 5,417,385 A | 5/1995 | Arnold |
| 5,434,354 A | 7/1995 | Baker |
| 5,470,413 A | 11/1995 | Cedarleaf |
| 5,483,412 A | 1/1996 | Albino |
| 5,485,870 A | 1/1996 | Kraik |
| 5,531,841 A | 7/1996 | O'Melia |
| 5,553,896 A | 9/1996 | Woodward |
| 5,571,992 A | 11/1996 | Maleski |
| 5,655,572 A | 8/1997 | Marena |
| 5,671,780 A | 9/1997 | Kertesz |
| 5,676,176 A * | 10/1997 | Usui .............. F16L 9/06 138/121 |
| 5,702,994 A | 12/1997 | Klosel |
| 5,716,193 A | 2/1998 | Mondet |
| 5,720,504 A * | 2/1998 | Stedman .......... F16L 25/0036 138/121 |
| 5,785,092 A | 7/1998 | Friedrich |
| 5,803,129 A | 9/1998 | Coronado et al. |
| 5,899,236 A | 5/1999 | Coronado et al. |
| 5,974,649 A | 11/1999 | Marena |
| 6,003,561 A | 12/1999 | Brindza |
| 6,006,788 A | 12/1999 | Jung |
| 6,039,084 A | 3/2000 | Martucci |
| 6,051,789 A | 4/2000 | Kato |
| 6,105,620 A | 8/2000 | Haberl |
| 6,170,533 B1 | 1/2001 | He |
| 6,180,954 B1 | 1/2001 | Verrier et al. |
| 6,201,183 B1 | 3/2001 | Enbom |
| 6,235,385 B1 | 5/2001 | Lee |
| 6,279,615 B1 | 8/2001 | Iio |
| 6,293,311 B1 | 9/2001 | Bushi |
| 6,310,284 B1 | 10/2001 | Ikeda |
| 6,315,004 B1 | 11/2001 | Wellman |
| 6,349,774 B2 | 2/2002 | Alhamad |
| 6,409,225 B1 | 6/2002 | Ito |
| 6,441,308 B1 | 8/2002 | Gagnon |
| 6,446,673 B1 | 9/2002 | Iio et al. |
| 6,561,229 B2 | 5/2003 | Wellman |
| 6,563,045 B2 | 5/2003 | Goett |
| 6,604,551 B2 | 8/2003 | Nishi et al. |
| 6,631,741 B2 | 10/2003 | Katayama |
| 6,641,884 B1 | 11/2003 | Martucci et al. |
| 6,652,939 B2 * | 11/2003 | Smith .............. F16L 9/147 138/137 |
| 6,655,414 B2 | 12/2003 | Nishi et al. |
| 6,657,126 B2 | 12/2003 | Ide |
| 6,671,162 B1 | 12/2003 | Crouse |
| 6,679,297 B1 | 1/2004 | Nishi et al. |
| 6,689,281 B2 | 2/2004 | Ikeda |
| 6,689,440 B2 | 2/2004 | Hsich |
| 6,732,765 B2 | 5/2004 | Schippl |
| 6,855,787 B2 | 2/2005 | Funaki et al. |
| 6,926,924 B2 | 8/2005 | Katayama et al. |
| 6,948,528 B2 | 9/2005 | Martucci et al. |
| 6,953,060 B2 * | 10/2005 | Pan .............. B05D 1/18 138/109 |
| 6,959,735 B2 | 11/2005 | Seyler |
| 6,966,344 B2 | 11/2005 | Coutarel |
| 7,011,114 B2 | 3/2006 | Suzuki et al. |
| 7,021,673 B2 | 4/2006 | Furuta |
| 7,040,351 B2 | 5/2006 | Buck |
| 7,044,167 B2 | 5/2006 | Rivest |
| 7,052,751 B2 | 5/2006 | Smith |
| 7,069,956 B1 | 7/2006 | Mosier |
| 7,104,285 B2 | 9/2006 | Furuta |
| 7,114,526 B2 | 10/2006 | Takagi |
| 7,132,141 B2 | 11/2006 | Thullen et al. |
| 7,155,812 B1 | 1/2007 | Peterson et al. |
| 7,223,312 B2 | 5/2007 | Vargo |
| 7,276,664 B2 | 10/2007 | Gagnon |
| 7,308,911 B2 | 12/2007 | Wilkinson |
| 7,316,548 B2 | 1/2008 | Jager |
| 7,328,725 B2 | 2/2008 | Henry |
| 7,367,364 B2 | 5/2008 | Rivest |
| 7,410,550 B2 | 8/2008 | Sherwin |
| 7,449,080 B2 | 11/2008 | Martucci et al. |
| 7,493,918 B2 | 2/2009 | Thomson |
| 7,516,762 B2 | 4/2009 | Colbachini |
| 7,517,563 B2 | 4/2009 | Hibino et al. |
| 7,562,448 B2 | 7/2009 | Goodson |
| 7,867,621 B2 | 1/2011 | Rawlings |
| 7,943,869 B2 | 5/2011 | Li |
| 8,048,351 B2 | 11/2011 | Bentley |
| 8,067,075 B2 | 11/2011 | Nishioka et al. |
| 8,231,993 B2 | 7/2012 | Sahu et al. |
| 8,439,603 B2 | 5/2013 | Witz et al. |
| 8,448,670 B2 | 5/2013 | Bentley |
| 8,713,797 B2 | 5/2014 | Witz et al. |
| 2001/0001986 A1 | 5/2001 | Alhamad |
| 2001/0030054 A1 | 10/2001 | Goett |
| 2002/0007860 A1 | 1/2002 | Katayama |
| 2002/0017333 A1 | 2/2002 | Wellman |
| 2002/0053448 A1 | 5/2002 | Ikeda |
| 2002/0081921 A1 | 6/2002 | Vargo |
| 2002/0145284 A1 | 10/2002 | Powell |
| 2002/0163415 A1 | 11/2002 | Ide |
| 2002/0174906 A1 | 11/2002 | Katayama |
| 2003/0012907 A1 | 1/2003 | Hsich |
| 2003/0019655 A1 | 1/2003 | Gagnon |
| 2003/0085049 A1 | 5/2003 | Nugent |
| 2003/0127147 A1 | 7/2003 | Van Dam |
| 2004/0020546 A1 | 2/2004 | Furuta |
| 2004/0028861 A1 | 2/2004 | Smith |
| 2004/0060610 A1 | 4/2004 | Espinasse |
| 2004/0090065 A1 | 5/2004 | Furuta |

(56) References Cited

U.S. PATENT DOCUMENTS

| | | | |
|---|---|---|---|
| 2004/0112454 A1 | 6/2004 | Takagi | |
| 2004/0129330 A1 | 7/2004 | Seyler | |
| 2004/0182463 A1 | 9/2004 | Bessette | |
| 2004/0200537 A1* | 10/2004 | Rivest | F16L 11/1185 138/109 |
| 2004/0200538 A1 | 10/2004 | Dalmolen | |
| 2004/0227343 A1 | 11/2004 | Takagi | |
| 2004/0261877 A1 | 12/2004 | Buck | |
| 2005/0067034 A1 | 3/2005 | Thomson | |
| 2005/0115623 A1 | 6/2005 | Coutarel | |
| 2005/0126651 A1 | 6/2005 | Sherwin | |
| 2005/0150596 A1 | 7/2005 | Vargo | |
| 2005/0181203 A1 | 8/2005 | Rawlings | |
| 2005/0211325 A1 | 9/2005 | Takagi | |
| 2005/0211326 A1 | 9/2005 | Hibino | |
| 2005/0229991 A1 | 10/2005 | Hardy | |
| 2006/0042711 A1 | 3/2006 | Hibino | |
| 2006/0051592 A1 | 3/2006 | Rawlings | |
| 2006/0143920 A1 | 7/2006 | Morrison | |
| 2006/0144456 A1 | 7/2006 | Donnison | |
| 2006/0254662 A1* | 11/2006 | Rivest | F16L 11/1185 138/121 |
| 2007/0012472 A1 | 1/2007 | Goodson | |
| 2007/0034275 A1 | 2/2007 | Henry | |
| 2007/0063510 A1 | 3/2007 | Gronquist | |
| 2007/0141927 A1 | 6/2007 | Brown | |
| 2007/0193642 A1 | 8/2007 | Werner | |
| 2007/0220732 A1 | 9/2007 | Liebson | |
| 2007/0281122 A1 | 12/2007 | Blanchard | |
| 2008/0017265 A1 | 1/2008 | Colbachini | |
| 2008/0131609 A1 | 6/2008 | Vargo | |
| 2008/0169643 A1 | 7/2008 | Marban | |
| 2008/0210329 A1 | 9/2008 | Quigley | |
| 2008/0236695 A1 | 10/2008 | Takagi | |
| 2008/0245434 A1 | 10/2008 | Hibino | |
| 2009/0084459 A1 | 4/2009 | Williams | |
| 2009/0114304 A1* | 5/2009 | Mohri | F16L 11/15 138/138 |
| 2009/0258220 A1 | 10/2009 | Schaaf | |
| 2010/0147546 A1 | 6/2010 | Mull | |
| 2010/0288390 A1 | 11/2010 | Colbachini | |
| 2011/0114351 A1 | 5/2011 | Koch | |
| 2012/0012222 A1 | 1/2012 | Mizutani et al. | |
| 2012/0168020 A1 | 7/2012 | Nakamura et al. | |

FOREIGN PATENT DOCUMENTS

| | | |
|---|---|---|
| CA | 2025252 | 10/1994 |
| CA | 2162985 A1 | 6/1996 |
| CA | 2061365 | 4/1998 |
| CA | 2245738 A1 | 6/1998 |
| CA | 2263462 A1 | 2/1999 |
| CA | 2084626 C | 10/2000 |
| CA | 2206609 C | 11/2000 |
| CA | 2422643 A1 | 3/2002 |
| CA | 2520276 A1 | 10/2004 |
| CA | 2538808 A1 | 4/2005 |
| CA | 2618866 A1 | 2/2007 |
| CA | 2651829 A1 | 11/2007 |
| CA | 2590121 A1 | 1/2008 |
| CA | 2621046 A1 | 8/2008 |
| DE | 9116565 U1 | 3/1993 |
| EP | 1010929 A1 | 6/2000 |
| GB | 1181765 | 2/1970 |
| GB | 1201722 | 8/1970 |
| GB | 1353452 | 5/1974 |
| GB | 2087031 | 5/1982 |
| GB | 2424935 A | 10/2006 |
| JP | 2002174374 A | 12/2000 |
| JP | 2002286175 A | 10/2002 |
| JP | 2002310381 A | 10/2002 |
| JP | 2002315170 A | 10/2002 |
| JP | 2003056760 A | 2/2003 |
| JP | 2003083482 A | 3/2003 |
| JP | 2003083483 A | 3/2003 |
| WO | WO 9806770 A1 | 2/1998 |
| WO | WO 0123794 A1 | 4/2001 |
| WO | WO 02087869 A2 | 11/2002 |
| WO | WO 2008116041 A2 | 9/2008 |
| WO | WO 2008150449 A1 | 12/2008 |
| WO | WO 2008150469 A1 | 12/2008 |

OTHER PUBLICATIONS

International Search Report, International Application No. PCT/US2010/40744, Oct. 28, 2010.
Written Opinion of the International Searching Authority, International Application No. PCT/US2010/40744, Oct. 28, 2010.
First Examination Report, New Zealand Application No. 620044, Feb. 19, 2014.
Dexmet Corporation, "Applications", http://www.dexmet.com/Expanded-Metal/applications/html, May 18, 2009.
Dexmet Corporation, "EMI/RFI shielding & ESD shielding with expanded metal", http://www.dexmet.com/ Expanded-Metal/shielding.html, May 18, 2009.
Dexmet Corporation, "Product Range", http://www.dexmet.com/Expanded-Metal/metal-foil-product-range.html, Jul. 13, 2009.
OmegaFlex, "Lightning Safety Recommendations for Gas Piping Systems", 2008.
International Preliminary Report on Patentability for International Application PCT/US2010/040744 mailed Feb. 21, 2012.

* cited by examiner

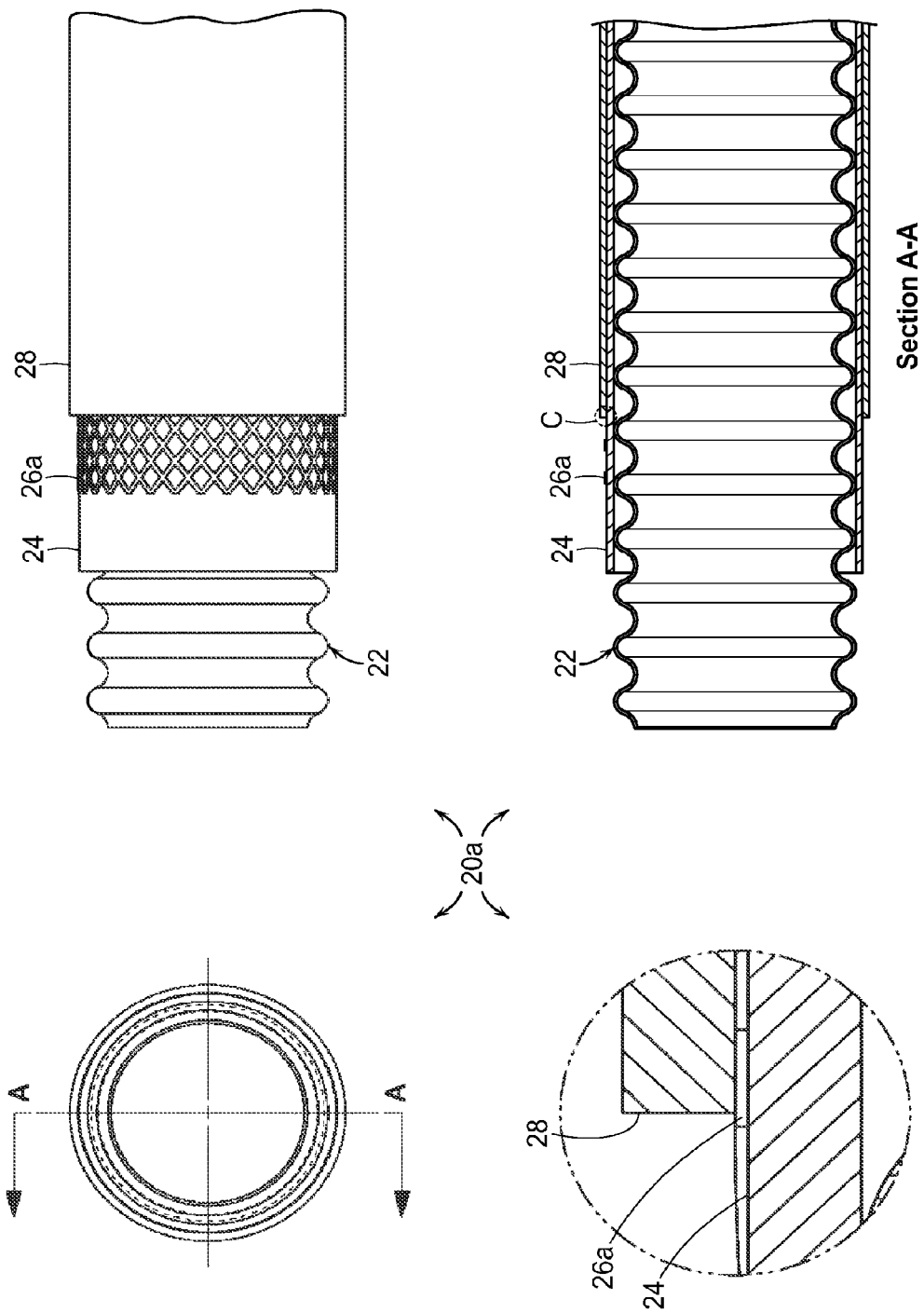

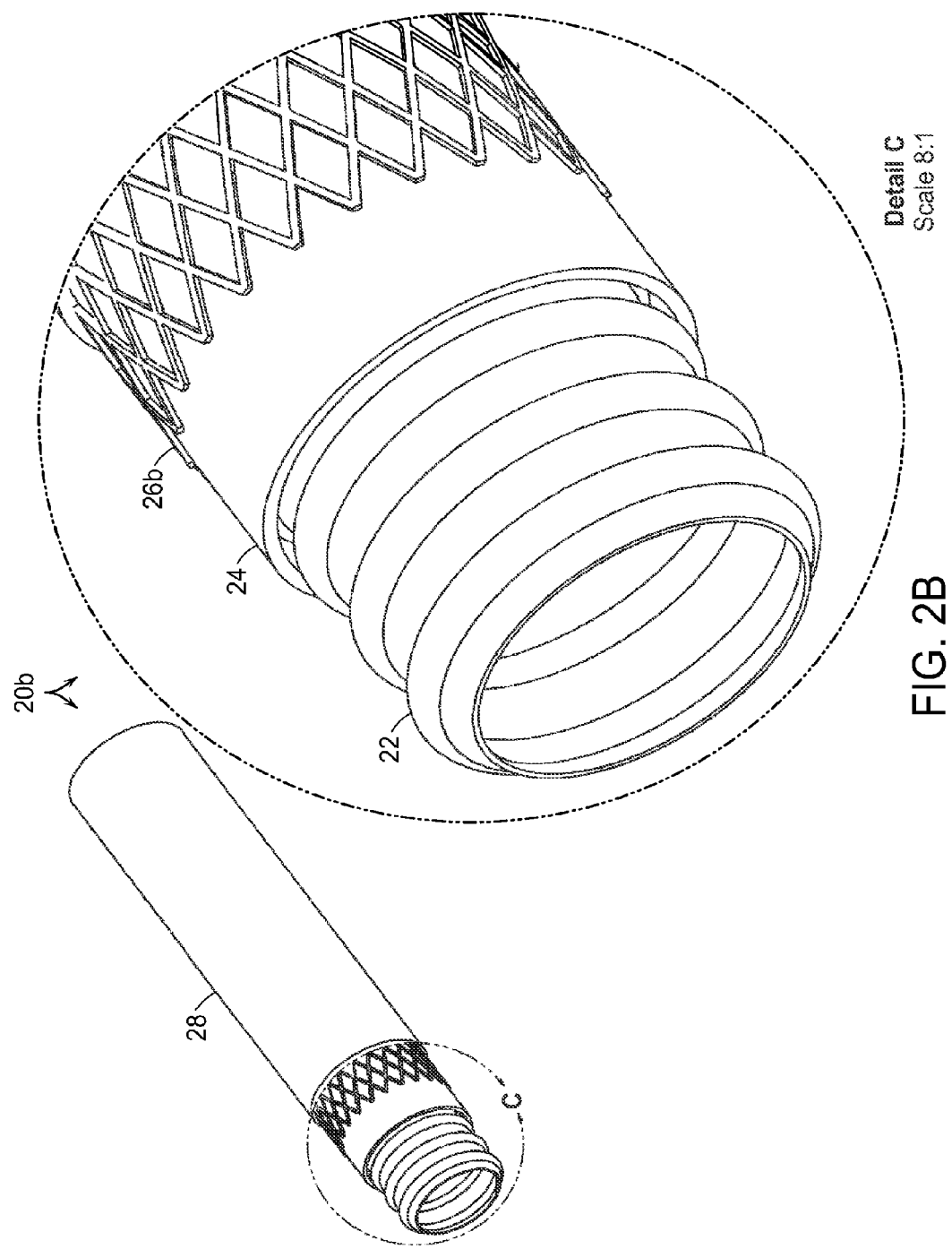

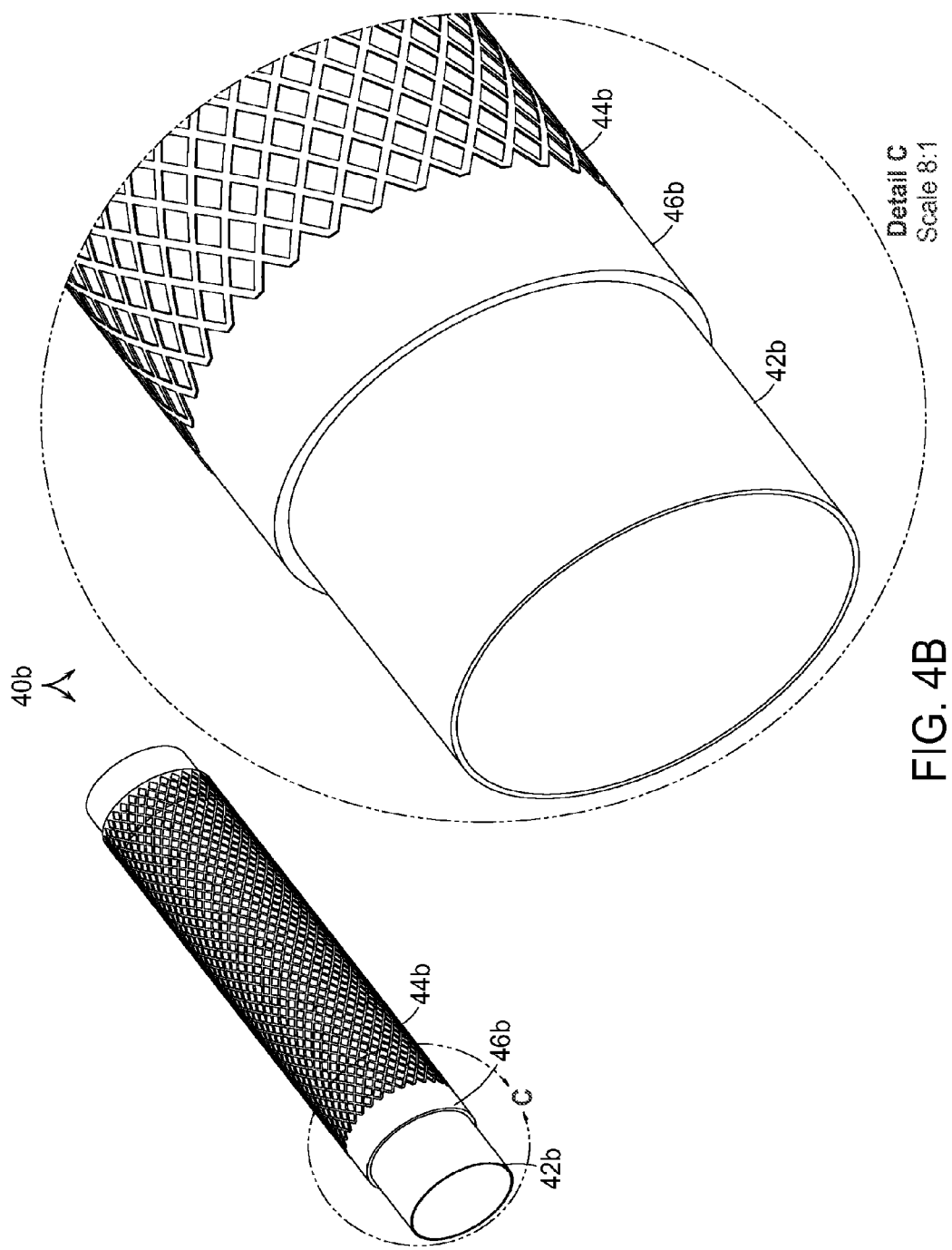

(1) (2)
(3) (4)

ENERGY DISSIPATIVE TUBES

CROSS-REFERENCE TO RELATED APPLICATIONS

This is a continuation under 35 U.S.C. §120 of U.S. patent application Ser. No. 12/828,769, filed Jul. 1, 2010, which claims priority to under 35 U.S.C. §119(e) to U.S. Provisional Patent Application Ser. No. 61/235,910, filed on Aug. 21, 2009, and U.S. Provisional Patent Application Ser. No. 61/321,689, filed on Apr. 7, 2010. The entire contents of each application is hereby incorporated by reference herein.

FIELD OF INVENTION

The present invention relates to gas, liquid, and slurry piping systems as well as protective conduit systems for cable carrying purposes, and more particularly to piping or tubing systems incorporating jackets and fittings capable of transferring and dissipating energy.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

Oftentimes, electrical currents will occur inside a structure. These electrical currents, which can vary in duration and magnitude, can be the result of power fault currents or induced currents resulting from lightning interactions with a house or structure. The term "fault current" is typically used to describe an overload in an electrical system, but is used broadly herein to include any electrical current that is not normal in a specific system. These currents can be the result of any number of situations or events such as a lightning event. Electrical currents from lightning can reach a structure directly or indirectly. Direct currents result from lightning that attaches to the actual structure or a system contained within the structure. When current from a nearby lightning stroke moves through the ground or other conductors into a structure, it is referred to as indirect current. While both direct and indirect currents may enter a structure through a particular system, voltage can be induced in other systems in the structure, especially those in close proximity to piping systems. This can often result in an electrical flashover or arc between the adjacent systems. A flashover occurs when a large voltage differential exists between two electrical conductors and the air ionizes and the material between the conductive bodies are punctured by the high voltage and form a spark.

SUMMARY OF THE INVENTION

Energy dissipative tubes, sealing devices, and methods of fabricating and installing the same are provided.

One aspect of the invention provides an energy dissipative tube including: a length of tubing; a first resin layer surrounding the outside of the tubing; an expanded metal foil adjacent to the outside of the first resin layer; and a second resin layer surrounding the expanded metal foil and the first resin layer.

This aspect can have a variety of embodiments. The first resin layer can include one or more materials selected from the group consisting of: a polymer, a thermoplastic polymer, and a thermoset polymer. The second resin layer can include one or more materials selected from the group consisting of: a polymer, a thermoplastic polymer, and a thermoset polymer.

The first resin layer can be electrically conductive. The first resin layer can have a volume resistivity of less than about $10^6$ ohm-cm. The first resin layer can be electrically insulative. The second resin layer can be electrically conductive. The second resin layer can have a volume resistivity of less than about $10^6$ ohm-cm. The second resin layer can be electrically insulative.

The expanded metal foil can completely surround the first resin layer. The expanded metal foil can substantially surround the first resin layer.

The tubing can be metallic tubing. The tubing can be thin-walled tubing. The tubing can be flexible tubing. The tubing can be corrugated tubing.

Another aspect of the invention provides an energy dissipative tube including: a length of tubing; a conductive layer adjacent to the outside of the tubing; and an insulative layer adjacent to the conductive layer.

This aspect can have a variety of embodiments. The conductive layer can include a metal. The metal can be a foil. The metal can be an expanded foil. The metal can be a perforated foil. The metal can be a metal tape. The metal can be a perforated metal tape. The metal can include one or more wires. The wires can be formed into a mesh. The one or more wires can be braided. The metal can include one or more selected from the group consisting of: copper, aluminum, silver, and gold. The conductive layer can have a higher electrical conductivity than the tubing. The tubing can be corrugated tubing.

The conductive layer can be a conductive resin. The conductive resin can have a volume resistivity of less than about $10^6$ ohm-cm.

Another aspect of the invention provides an energy dissipative tube including: a length of tubing; a metal layer adjacent to the outside of the tubing; and a resin layer adjacent to the metal layer.

This aspect can have a variety of embodiments. The metal layer can be an expanded foil. The resin can be a conductive resin. The conductive resin can have a volume resistivity of less than about $10^6$ ohm-cm. The resin can be an insulative resin.

Another aspect of the invention provides an energy dissipative tube including: a length of tubing; a resin layer adjacent to the outside of the tubing; and a metal layer adjacent to the resin layer.

Another aspect of the invention provides a method of fabricating energy dissipative tubing. The method includes: providing a length of tubing; applying a first resin layer surrounding the outside of the tubing; applying an expanded metal foil adjacent to the outside of the first resin layer; and applying a second resin layer surrounding the expanded metal foil and the first resin layer.

Another aspect of the invention provides a method of fabricating energy dissipative tubing. The method includes: providing a length of tubing; applying a conductive layer adjacent to the outside of the tubing; and applying an insulative layer adjacent to the conductive layer.

Another aspect of the invention provides a method of installing energy dissipative tubing. The method includes: providing a length of energy dissipative tubing including a length of tubing, a first resin layer surrounding the outside of the tubing, an expanded metal foil adjacent to the outside of the first resin layer, and a second resin layer surrounding the expanded metal foil and the first resin layer; and coupling a fitting to an end of the energy dissipative tubing. The fitting creates electrical continuity with the expanded metal foil.

Another aspect of the invention provides a method of installing energy dissipative tubing. The method includes: providing a length of energy dissipative tubing including a length of tubing, a conductive layer adjacent to the outside of the tubing, and an insulative layer adjacent to the conductive layer; and coupling a fitting to an end of the energy dissipative tubing. The fitting creates electrical continuity with the conductive layer.

Another aspect of the invention provides a sealing device for connecting an energy dissipative tube having a length of tubing, a first resin layer surrounding the outside of the tubing, a conductive layer adjacent to the outside of the first resin layer, and a second resin layer surrounding the conductive layer and the first resin layer. The sealing device includes one or more penetrating members configured to penetrate the second resin layer and establish electrical continuity with the conductive layer.

This aspect can have a variety of embodiments. In one embodiment, the one or more penetrating members do not penetrate the first resin layer. In another embodiment, the one or more penetrating members do not establish electrical continuity with the tubing. In still another embodiment, the one or more penetrating members are substantially triangular. In yet another embodiment, the one or more penetrating members are formed on a split bushing.

The one or more penetrating members can extend circumferentially around the split bushing. The one or more penetrating members can include at least one radial cutting edge. The one or more penetrating members can include at least one tangential cutting edge.

The sealing device of claim can include a sleeve portion. The split bushing can be received within the sleeve portion. The exterior of the sleeve portion can include one or more threads. The sealing device can include a nut operably connected to the one or more threads on the exterior of the sleeve portion. The nut can be configured to advance the bushing when the nut is tightened. The split bushing can have a geometry that interacts with the sleeve portion to facilitate penetrating the second resin layer and establishing electrical continuity with the conductive layer.

The split bushing can be metallic. The split bushing can be brass. The one or more penetrating members can be metallic. The sealing device can be configured to form a seal with one end of the length of tubing and wherein electrical continuity is established between the sealing device and the end of the length of tubing.

Another aspect of the invention provides a sealing device for connecting an energy dissipative tube having a length of tubing, a first resin layer surrounding the outside of the tubing, a conductive layer adjacent to the outside of the first resin layer, and a second resin layer surrounding the conductive layer and the first resin layer. The sealing device includes: a body member including a sleeve portion and a bushing arranged to be received in the sleeve portion. The bushing includes one or more penetrating members configured to penetrate the second resin layer and establish electrical continuity with the conductive layer.

This aspect can have a variety of embodiments. The bushing can be a split bushing. The split bushing can be configured to penetrate the second resin layer substantially radially. The split bushing can be configured to penetrate the second resin layer substantially tangentially.

The exterior of the sleeve portion can include one or more threads. The sealing device can include a nut operably connected to the one or more threads on the exterior of the sleeve portion. The nut is arranged to advance the bushing when the nut is tightened.

Another aspect of the invention provides a method of installing energy dissipative tubing. The method includes: providing a length of energy dissipative tubing including a length of tubing, a first resin layer surrounding the outside of the tubing, an expanded metal foil adjacent to the outside of the first resin layer, and a second resin layer surrounding the expanded metal foil and the first resin layer; and coupling a sealing device to an end of the energy dissipative tubing. The sealing device includes one or more penetrating members configured to penetrate the second resin layer and establish electrical continuity with the expanded metal foil.

This aspect can have a variety of embodiments. In one embodiment, the one or more penetrating members are arranged on a split bushing.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIGS. 2A-2D depicts an energy dissipative tube in accordance with preferred embodiments of the invention.

FIGS. 4A and 4B depict energy dissipative tubes in accordance with alternate preferred embodiments of the invention.

DEFINITIONS

The instant invention is most clearly understood with reference to the following definitions:

As used herein, the singular form "a", "an" and "the" include plural references unless the context clearly dictates otherwise.

As used herein, the terms "corrugated stainless steel tubing" and "CSST" refer to any type of tubing or piping, which may accommodate corrosive or aggressive gases or liquids, and includes but is not limited to tubing or piping made from: thermoplastics, metal or metal alloy materials such as olefin-based plastics (e.g., polyethylene (PE)), fluorocarbon polymers (e.g., polytetrafluoroethylene (PTFE)), carbon steel, copper, brass, aluminum, titanium, nickel, and alloys thereof.

As used herein, the term "resin" refers to any synthetic or naturally occurring polymer.

DETAILED DESCRIPTION OF THE INVENTION

Tubing having an energy dissipative jacket and methods for fabricating and installing the same are disclosed.

Figure 1:
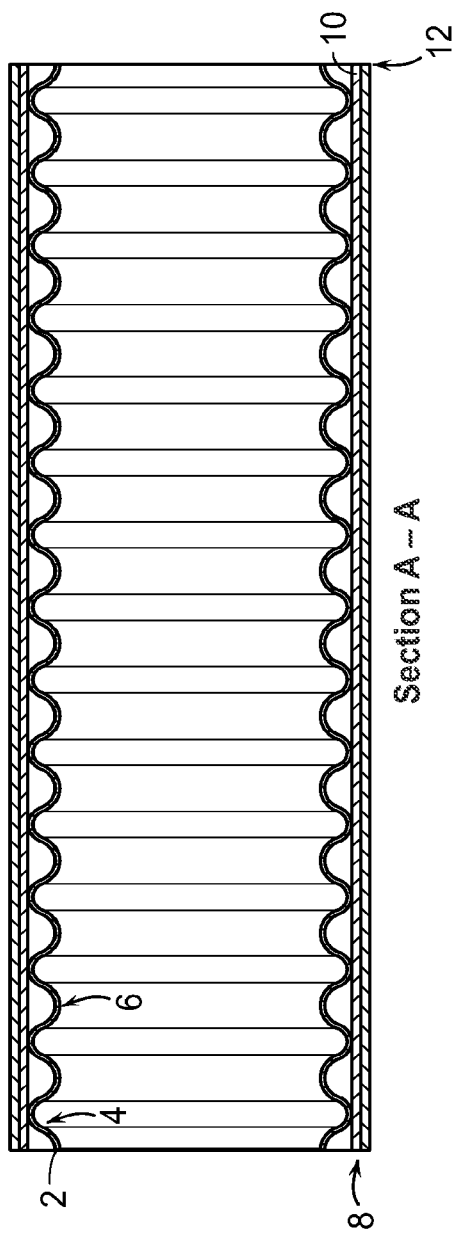
FIG. 1 depicts a multi-layer jacketed tube in accordance with the prior art.
Figure 1:
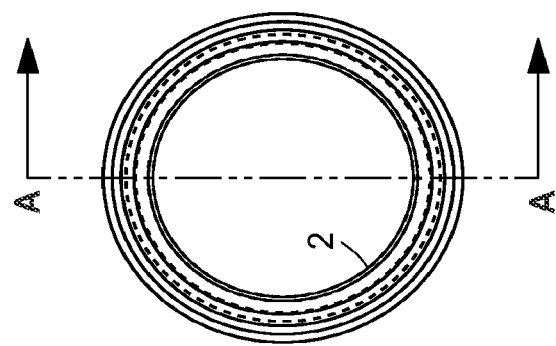

Referring to FIG. 1, a length of corrugated tubing 2 according to the prior art is provided. The corrugated tubing 2 may be composed of stainless steel or any other suitable material. The tubing 2 contains a number of corrugation peaks 4 and corrugation valleys 6. A jacket 8 (e.g., a multi-layer jacket) covers the outside of the tubing 2.

The jacket 8 can include a plurality of layers 10, 12. The layers 10, 12 generally form an annulus around the tubing 2, but may have a circular or non-circular cross-section.

Energy Dissipative Tubing

In order to better absorb energy from fault currents and lightning strikes, according to preferred embodiments of the invention, energy dissipative jackets 8 are provided that dissipate electrical and thermal energy throughout the respective jackets 8, thereby protecting the tubing 2. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

Referring now to FIG. 2A, one embodiment of energy dissipative tubing 20a is provided. The energy dissipative tubing 20a includes a length of tubing 22. The tubing 22 can be metal tubing, thin-walled metal tubing, corrugated tubing, corrugated stainless steel tubing, or the like.

Tubing 22 is surrounded by a first resin layer 24, a metal layer 26a, and a second resin layer 28. Resin layers 24, 28 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

Conductive resin layers can be formed by impregnating a resin with conductive material such as metal particles (e.g., copper, aluminum, gold, silver, nickel, and the like), carbon black, carbon fibers, or other conductive additives. In some embodiments, the metal layer 26 and/or one or more of the resin layers 24, 28 has a higher electrical conductivity than the tubing 22. In some embodiments, the volume resistivity of the conductive resin can be less than about $10^6$ ohm-cm (e.g., $9 \times 10^6$ ohm-cm) as tested in accordance with ASTM standard D4496.

In some embodiments, each resin layer 24, 28 has a thickness of about 0.015" to about 0.035".

Metal layer 26 can include one or more metals (e.g., ductile metals) such as aluminum, cadmium, niobium (also known as "columbium"), copper, gold, nickel, platinum, silver, tantalum, titanium, zinc, zirconium, and the like and alloys thereof (e.g., austentitic nickel-chromium-based superalloys, brass, low carbon steel, phosphor bronze, stainless steel, and the like). The metal(s) can be formed into foils, perforated foils, tapes, perforated tapes, cables, wires, strands, meshes, braids, and the like.

In some embodiments, the metal layer 26 is an expanded metal foil. A variety of expanded metal foils are available from the Dexmet Corporation of Wallingford, Conn. Several exemplary embodiments of energy dissipative tubing 20 with various expanded metal foils are depicted in FIGS. 2A-2D.

Expanded metal foils are particularly advantageous because they provide uniform protection while minimizing weight and allowing for flexibility of the tubing 20. When the tubing 20 is bent, the expanded metal foil will either stretch or break on the outside of the bend. In either case, a continuous path is still maintained in the inside of the bend to allow for energy to be dissipated. The expanded metal foil can be designed to not break on the outside of a bend with an appropriate design based on specified bend radii.

In some embodiments, expanded or perforated metal foils include a plurality of voids. The voids can be formed in a variety of shapes including circles, ellipses, triangles, quadrilaterals, rectangles, squares, trapezoids, parallelograms, rhombuses, pentagons, hexagons, heptagons, octagons, nonagons, decagons, n-gons, and the like. The voids can be formed through a variety of techniques. For example, a plurality of foils or wires can be assembled in a parallel formation and bonded at regular intervals before the bonded assembly is stretched laterally to form voids between the non-bonded portions of the foils or wires. Additionally or alternatively, the voids can be created with a mechanical device (e.g., dies, drills, punches, molds, and the like), chemical means (e.g., chemical etching, photochemical etching, and the like), and/or electrical means (e.g., electrical discharge machining and the like).

In some embodiments, the metal layer 26 completely surrounds the first resin layer 24. In such embodiments, the metal may overlap and/or be welded or soldered in some regions. In other embodiments, the metal layer 26 substantially surrounds the first resin layer 24. In such embodiments, a small portion of the first resin layer 24 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 26 can be wrapped spirally or helically around the first resin layer 24. In such an embodiment, the metal layer 26 can overlap or substantially surround the first resin layer 24

Various thicknesses of the resin layers 24, 28 and the metal layer 26 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 24, 28 can be the same or different thickness and can include the same or different materials. Various colors or markings can be added to resin layers, for example, to clearly distinguish the resin layers 24, 28 from each other and from the metal layer 26 and/or to make the tubing 20 more conspicuous.

Figure 2C:
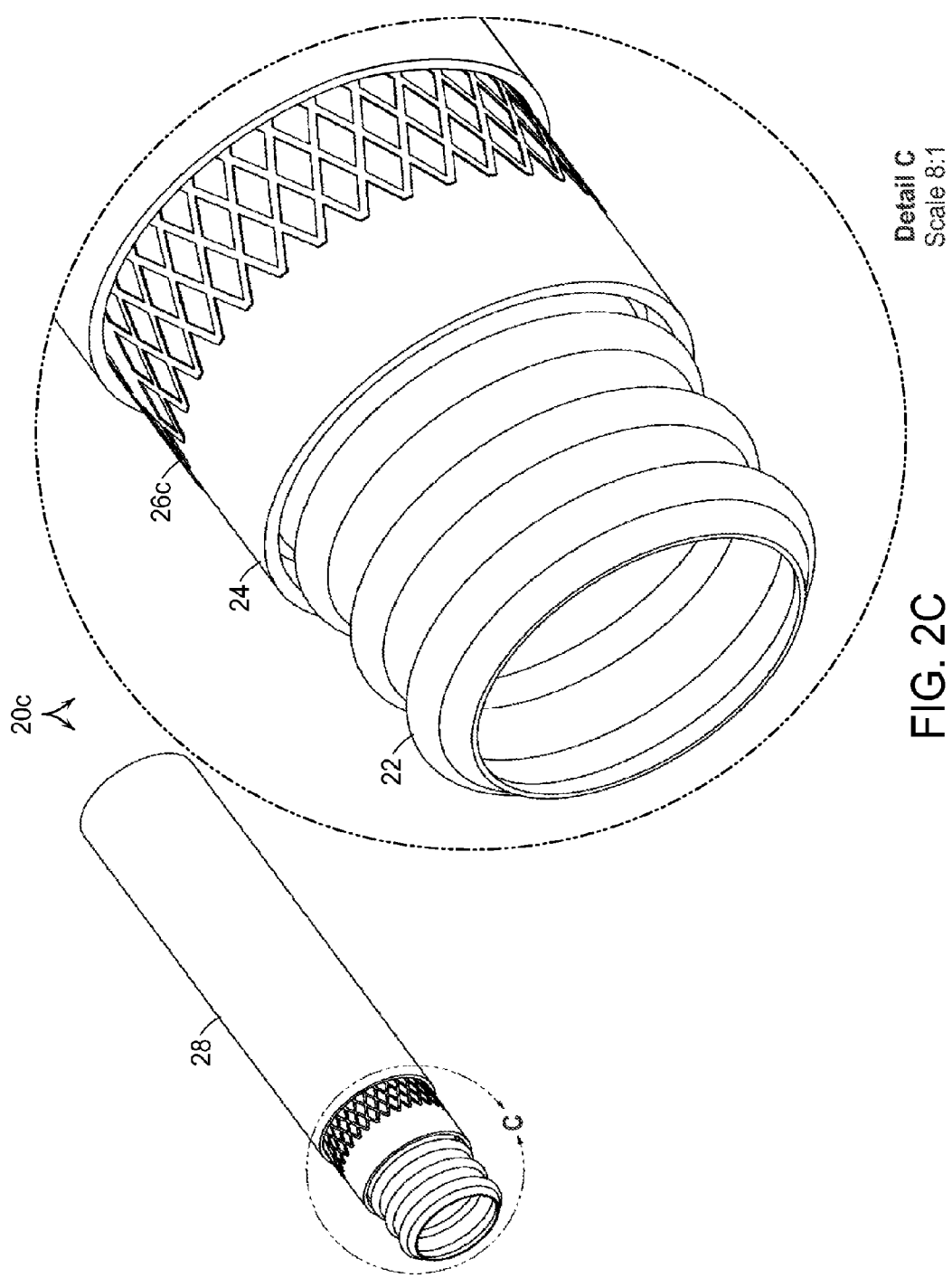
Figure 2D:
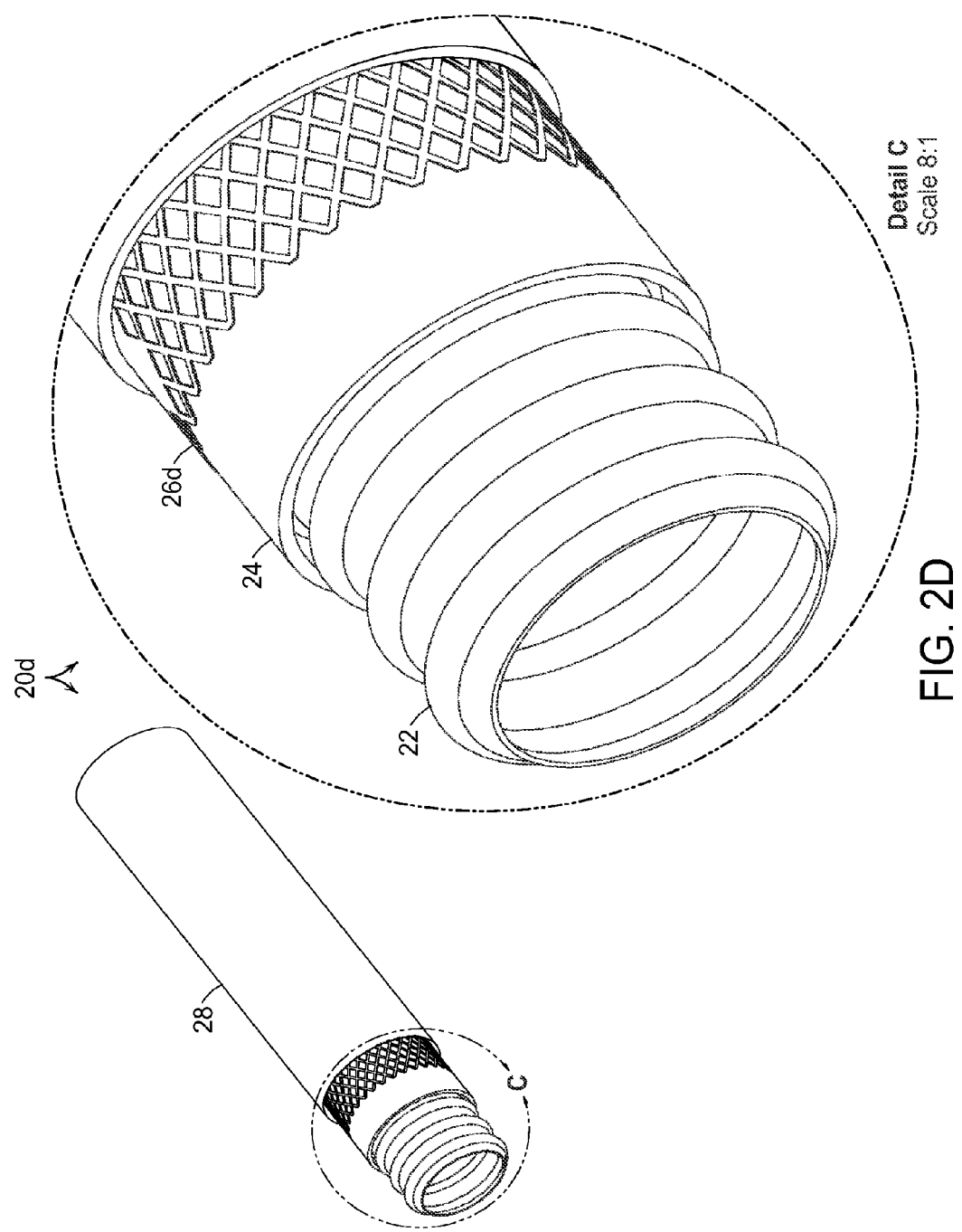

Referring again to FIGS. 2A-2D, various embodiments of tubing 20 having expanded metal foils are provided. In FIG. 2A, the expanded metal foil 26a has a plurality of rhombus-shaped voids (e.g., rhombuses with internal angles of approximately 80° and approximately 100°). In FIG. 2B, the expanded metal foil 26b again has a plurality of rhombus-shaped voids. Expanded metal foil 26b differs from expanded metal foil 26a by the lengthening of the voids 26b. For example the voids can be rhombuses with internal angles of approximately 70° and approximately 110°. In FIG. 2C, the expanded metal foil 26c resembles to the expanded metal foil 26b in FIG. 2B, but is wider relative to the voids. In FIG. 2D, the expanded metal foil 26d again has a plurality of rhombus-shaped voids. The expanded metal foil 26d is wider between the voids and the rhombus-shaped voids approach square-shaped voids with internal angles of approximately 85° and approximately 95°.

In some embodiments, the metal layer 26 has a thickness between about 0.003" and about 0.010". This thickness can be varied to reflect varying properties of metals. In some embodiments, the metal layer 26 has a mass per square foot between about 0.045 and about 0.070 pounds per square foot.

Figure 3A:
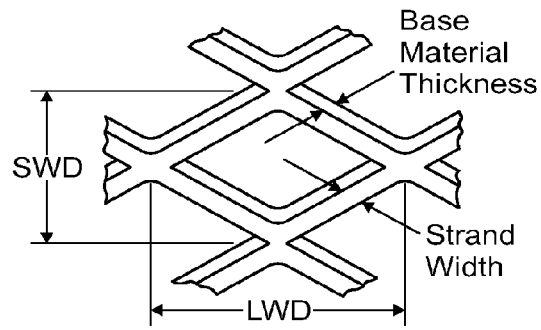
FIG. 3A depicts an expanded metal foil in accordance with a preferred embodiment of the invention.
Figure 3B:
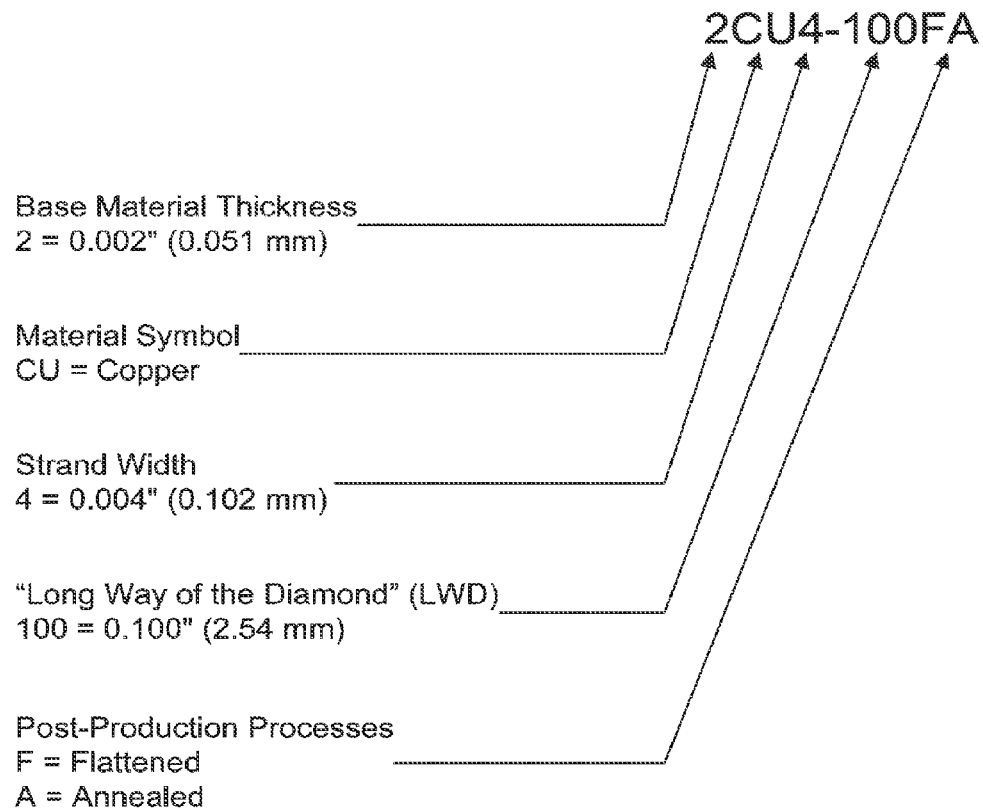
FIG. 3B depicts a nomenclature for expanded metal foils in accordance with a preferred embodiment of the invention.

Referring now to FIGS. 3A and 3B, a variety of expanded metal foils are available. For example, MICROGRID® expanded metal foils, available from Dexmet Corporation, are specified by product codes illustrated by FIG. 3B in the context of FIG. 3A. The first number in the product code indicates the base material thickness in thousandths of inches. The letters indicate the chemical symbol of the material. The second numbers indicate the strand width in thousandths of inches. The third number indicates the length of the long axis of the void or diamond in thousandths of inches. The second letters indicate post-production processing of the expanded metal foil. The letter "F" indicates that the expanded metal foil is flattened. The letter "A" indicates that the expanded metal foil is annealed. A variety of expanded metal foils are suitable for use in embodiments of the invention including 3CU7-100FA, 8AL19-125F, 10AL14-190F, 3CU14-125FA, 6AL8-080F, and the like.

Figure 4A:
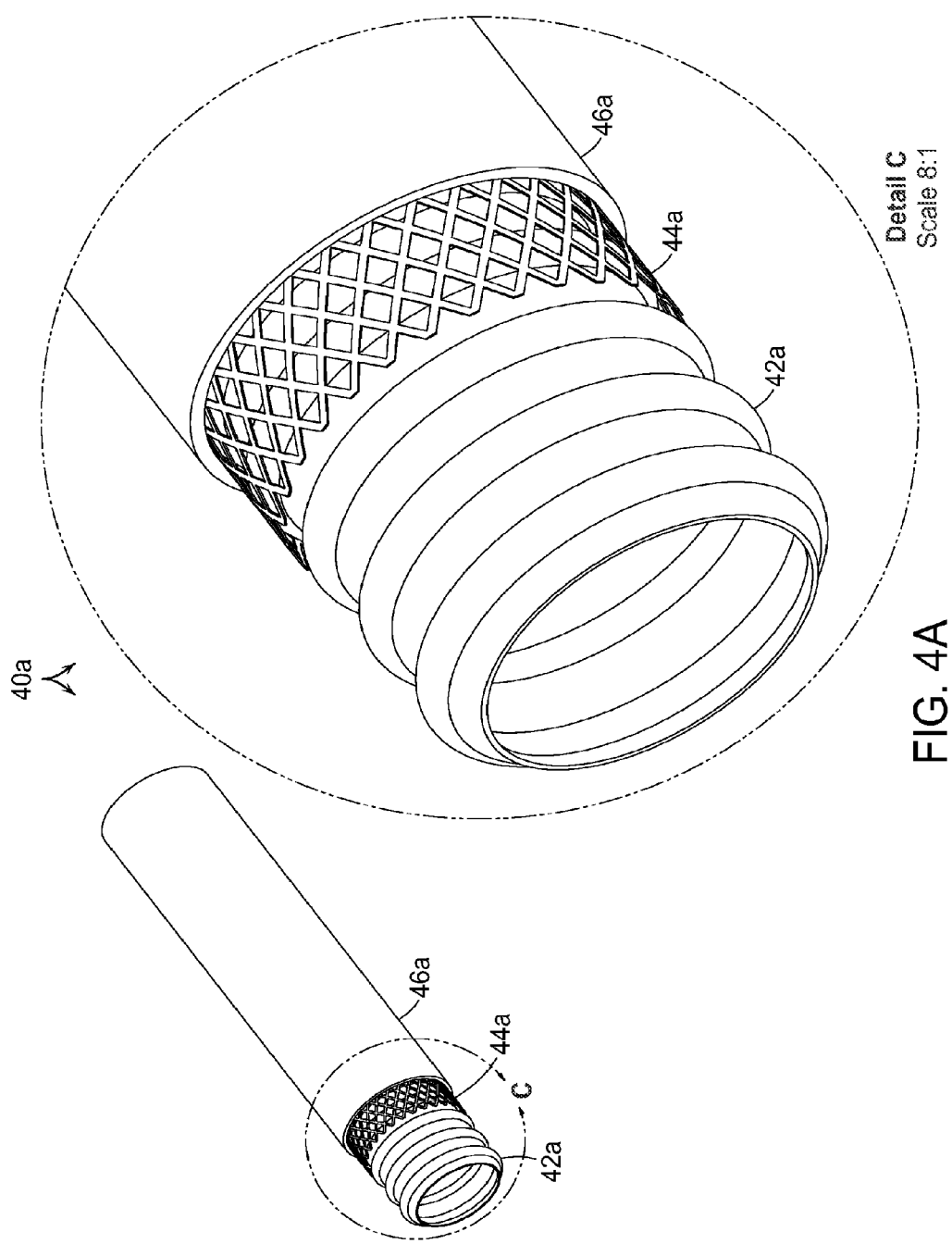

Referring now to FIG. 4A, an alternate preferred embodiment of energy dissipative tubing 40a is provided. The energy dissipative tubing 40a includes a length of tubing 42a surrounded by a metal layer 44a and a resin layer 46a. Metal layer 44a and resin layer 46a can include the same or similar materials described in the context of FIGS. 2A-2D herein.

Referring now to FIG. 4B, an alternate preferred embodiment of energy dissipative tubing 40b is provided. The energy dissipative tubing 40b includes a length of tubing 42b surrounded by a resin layer 46b and a metal layer 44b. Metal layer 44b and resin layer 46b can include the same or similar materials described in the context of FIGS. 2A-2D herein.

In some embodiments, one or more layers positioned adjacent to the tubing 2, 22, 42, 52 are conductive. Research shows that conductive layers can better protect thin-walled tubing 2, 22, 42, 52 by substantially evenly distributing electricity throughout the tubing 2, 22, 42, 52 and/or by providing sacrificial means to transfer and dissipate the electrical energy. In contrast, insulative layers resist electrical energy until the potential difference between the inner conductive tubing and another conductive element is large enough to create a dielectric breakdown of the insulative layer thereby allowing electrical energy to enter through the compromised insulative layer and on to the thin-walled tubing 2, 22, 42, 52 at a single point and damaging the thin-walled tubing 2, 22, 42, 52.

In some embodiments, the entire jacket is conductive. For example, tubing 22 can be surrounded by a first conductive resin layer 24, a metallic layer 26, and a second conductive layer 28.

Energy Dissipative Conduits

The principles discussed herein can be used in applications other than the transportation of fluids. For example, the principles and embodiments described herein can be applied to produce energy dissipative corrugated or smooth bore conduits for the protection and routing of electrical and communication cables (e.g., coaxial cable, twisted pair cable, fiber optic cable, and the like). Likewise, both energy dissipative corrugated or smooth bore tubing can be used to transport gases, liquids, and slurries.

Figure 5:
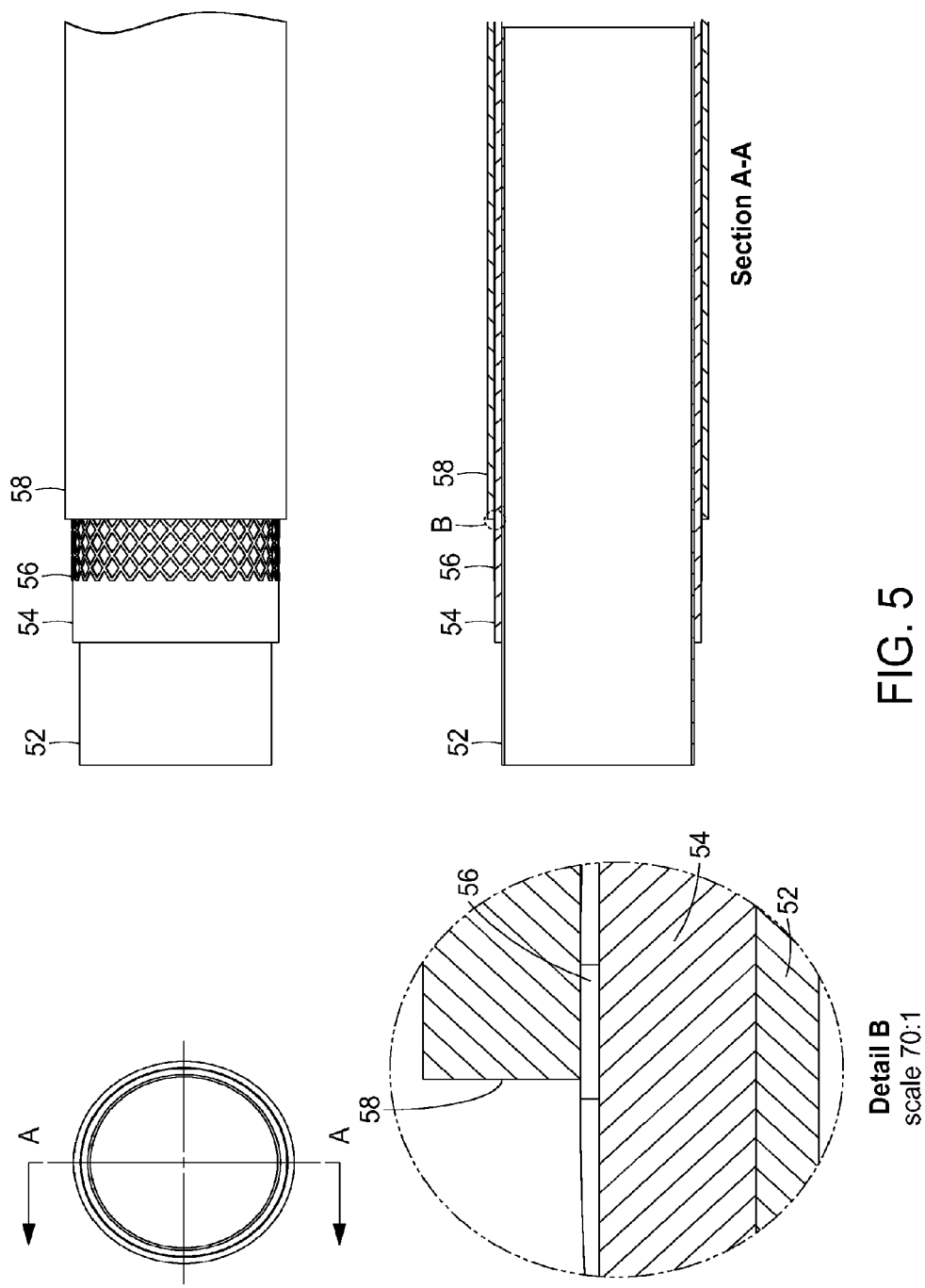
FIG. 5 depicts an energy dissipative smooth bore tube in accordance with a preferred embodiment of the invention.

Referring now to FIG. 5, the particular configuration of energy dissipative conduits 50 can vary in compliance with various regulations (e.g., the National Electrical Code as published by the National Fire Protection Association and promulgated by various municipalities). In some embodiments, the internal tube 52 is corrugated tubing as depicted in FIGS. 2A-2D. In still other embodiments, the internal tube 52 is a smooth bore tube as depicted in FIG. 5. Tube 52 can be conventional conduit such as rigid metal conduit (RMC), rigid nonmetallic conduit (RNC), galvanized rigid conduit (GRC), electrical metallic tubing (EMT), electrical nonmetallic tubing (ENT), flexible metallic conduit (FMC), liquidtight flexible metal conduit (LFMC), flexible metallic tubing (FMT), liquidtight flexible nonmetallic conduit (LFNC), aluminum conduit, intermediate metal conduit (IMC), PVC conduit, and the like. In some embodiments, an internal tube 52 is omitted.

As described herein, inner tube 52 can be enclosed in one or more resin layers 54, 58 and one or more metal layers 56.

Additional Layer Features

In further embodiments of the invention, one or more layers of the jacket possess various properties such as flame resistance, heat resistance, sound insulation, temperature insulation, oil or water impermeability, and/or wear resistance.

For example, a layer (e.g., the outermost layer) may incorporate a fire retardant. Suitable layers include polymers incorporating about 20% to 60% magnesium hydroxide, aluminum trihydrate, and/or halogenated fire retardants by weight.

In some embodiments, one or more of the resin layers have a 25/50 flame spread/smoke density index as measured in accordance with the ASTM E84 standard.

In order to better comply with installation requirements, some embodiments of resin layers are capable of elongation greater than or equal to about 200% as measured in accordance with the ASTM D638 standard.

In other embodiments, the outer layer includes wear resistant materials such as wire, cable, strands of material such as poly-aramid synthetic fiber such as KEVLAR® (available from E.I. Du Pont de Nemours and Company of Wilmington, Del.), and the like. Such materials may be incorporated within a polymer or resin layer or may be exposed. In some embodiments, a layer is formed by twisting an interlocking metal strip around the tubing and underlying jacket layers similar to the metal sheath on BX or TECK type electrical cables.

Although embodiments of the invention having two or three layer jackets are depicted and discussed herein, the invention is not limited to jackets having particular number of layers. Rather, additional embodiments in which a jacket includes more than three layers are contemplated according to the principles, patterns, and spirit of the specific embodiments described herein.

Methods of Fabricating Energy Dissipative Tubing

Figure 6:
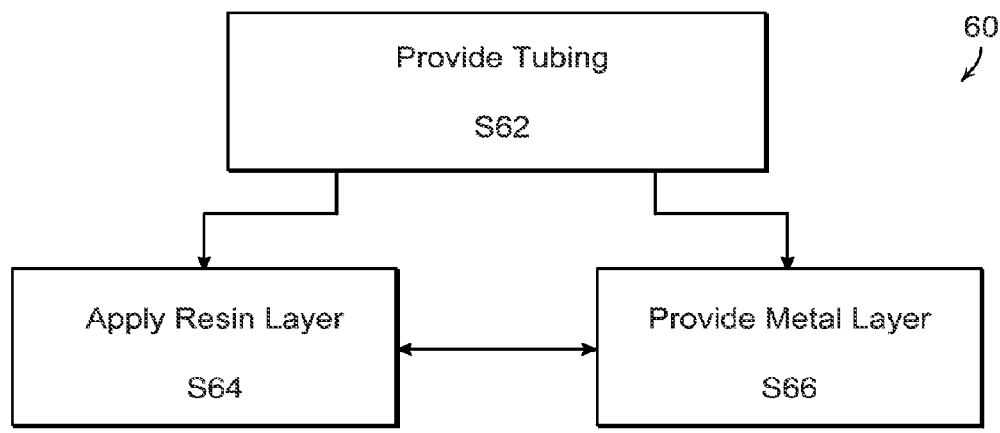
FIG. 6 depicts a method of fabricating an energy dissipative tube in accordance with the subject invention.

Energy dissipative tubing can be fabricated in accordance with existing techniques for the manufacture of CSST. An exemplary method 60 for fabricating energy dissipative tubing is depicted in FIG. 6.

In step S62, a length of tubing is provided. The tubing can be metal tubing, thin-walled metal tubing, corrugated tubing, corrugated stainless steel tubing, and the like. Embodiments of suitable tubing are described herein.

In step S64, a resin layer is applied to the exterior of the tubing (and any intervening jacket layers). The resin layer can be applied by known extrusion techniques.

In step S66, a metal layer is applied to the exterior of the tubing (and any intervening jacket layers). The metal layer can be applied by a variety of techniques. Foils, tapes, wires, and the like can be wound onto the tubing. In some embodiments, an adhesive (e.g., an electrically conductive adhesive) is used to secure the metal layer to the tubing and/or an intervening jacket layer. Braids and meshes can be formed by various known techniques in the rope-, wire-, and cable-making fields.

As will be appreciated, steps S64 and S66 can be repeated in variety of patterns. For example, consecutive resin and/or metal layers can be applied to the tubing.

In some embodiments, the metal layer is embedded or partially embedded in one or both of the resin layers. This can be accomplished by pressing the metal layer into the resin layer while the resin is curing. In other embodiments, the metal is applied over a cured resin layer (e.g., to aid in easy removal of the metal layer for installation and/or recycling).

Methods of Installing Energy Dissipative Tubing

Figure 7:
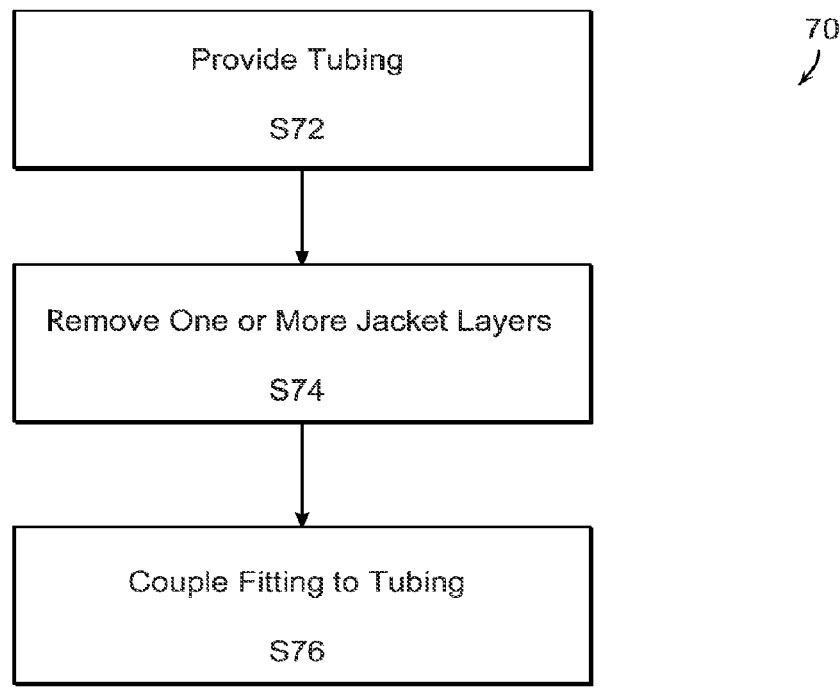
FIG. 7 depicts a method of installing an energy dissipative tube in accordance with the subject invention.

Energy dissipative tubing can be installed in accordance with existing techniques for the manufacture of CSST. An exemplary method 70 for installing energy dissipative tubing is depicted in FIG. 7.

In step S72, a length of energy dissipative tubing is provided. Tubing may be provided in lengths (e.g., 8' sticks) or on reels.

In step S74, one or more jacket layers are optionally removed in accordance with the instructions for a fitting. The one or more layers can be removed with existing tools such as a utility knife, a razor blade, a tubing cutter, and the like.

In step S76, the fitting is coupled to the tubing in accordance with the instructions for the fitting. The fitting may, in some embodiments, contact one or more conductive layers (e.g., conductive resin layers or metal layers) to create electrical continuity between the conductive layer(s) and the fitting, thereby grounding the conductive layer(s). For example, the fitting can include one or more conductive teeth that penetrate an outer resin layer to ground the metal layer.

Working Example

An embodiment of the invention was tested in accordance with SAE Standard No. ARP5412—"Aircraft Lightning Environment and Related Test Waveforms."

Figure 8:
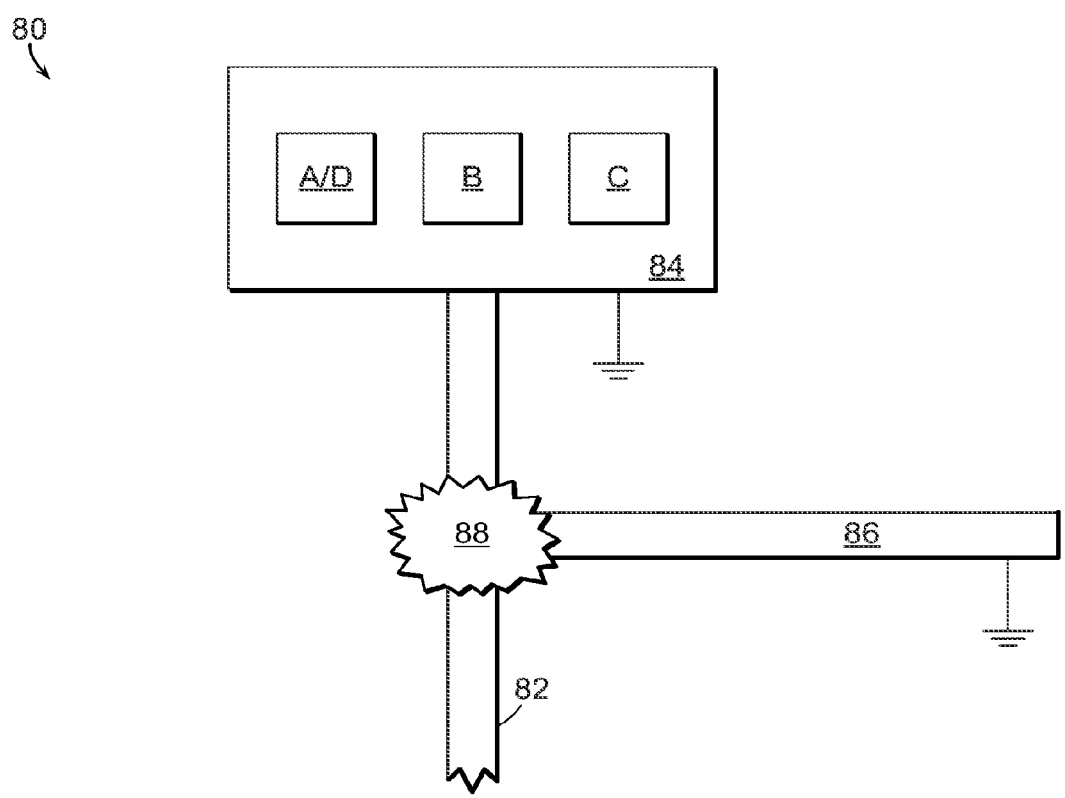
FIG. 8 depicts a system for testing tubing and conduit in accordance with a preferred embodiment of the subject invention.

A schematic of the testing apparatus 80 is provided in FIG. 8. A length of tubing 82 (including any metallic layers) is connected to power source 84. Tubing 82 can be any tubing or conduit described herein or can be other tubing for use as a control during testing. The power source 84 can, in some embodiments, contain three energy storage capacitors/battery banks that are capable of producing the waveforms described as current components A/D, B, and C in SAE Standard No. ARP5412 discussed above. Ground plate 86 contacts or is in close proximity to tubing 82 at contact point 88. In some embodiments, capacitors/battery banks A/D, B, C are discharged at the same time. The electricity arcs through any resin layers at contact point 88 and flows to ground plate 86.

Referring to Table 1 below, lengths of tubing (Samples A and C) including a layer of 8AL19-125F MICROGRID® expanded metal foil, available from Dexmet Corporation, and a length of conventional tubing (Sample B) coated with a conductive resin were exposed to A/D, B, C electrical current waveforms in accordance with SAE ARP5412.

TABLE 1

| | | A/D Bank | | B Bank | | C Bank | | Total | |
|---|---|---|---|---|---|---|---|---|---|
| Sample | Foil | Peak Current (kA) | Action Integral (A²s) | Average Current (kA) | Charge Transfer (C) | Average Current (A) | Charge Transfer (C) | Charge (C) | Result |
| A | Yes | 33.00 | 34,000 | 2.00 | 10.00 | 422.00 | 140.95 | 150.95 | Pass |
| B | No | 32.00 | 30,000 | 2.00 | 10.00 | 433.00 | 148.95 | 158.95 | Fail |
| C | Yes | 66.00 | 116,000 | 2.00 | 10.00 | 435.00 | 107.90 | 117.00 | Pass |

Figure 9A:
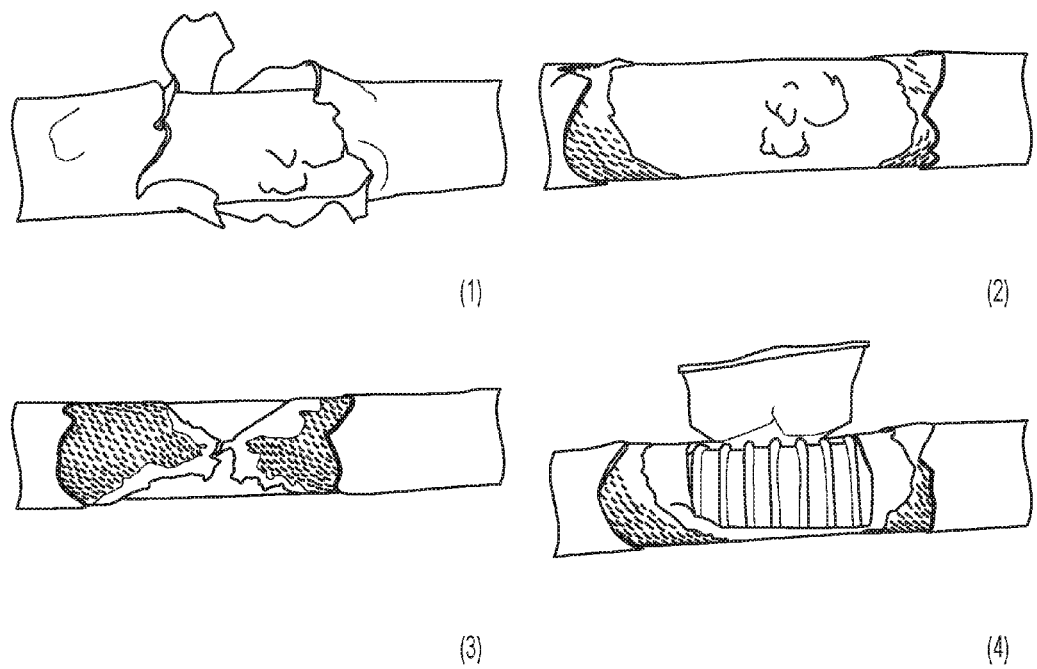
FIG. 9A is a compilation of four line drawings derived from photographs of energy dissipative tubing in accordance with a preferred embodiment of the invention after exposure to electricity in accordance with the SAE ARP5412 standard.
Figure 9B:
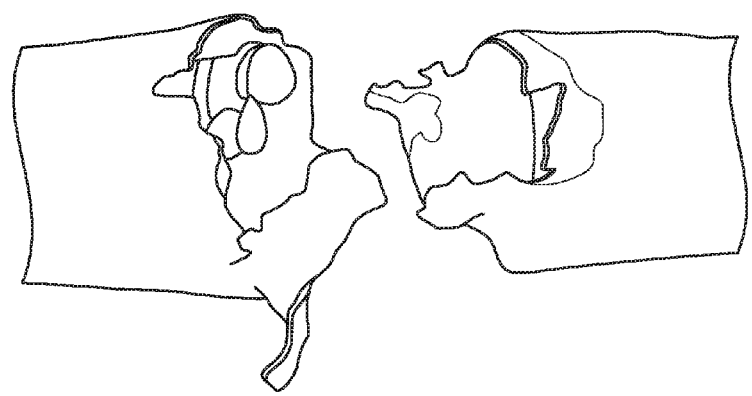
FIG. 9B is a line drawing derived from a photograph of tubing coated with a conductive resin after exposure to electricity in accordance with the SAE ARP5412 standard.

FIGS. 9A and 9B clearly demonstrate the effectiveness of the energy dissipating layers described herein. FIG. 9A depicts Sample A. In FIG. 9A(1), a portion of the outer resin layer is ablated. Further removal of the outer resin layer in FIG. 9A(2) clearly shows the vaporization of a portion of the energy dissipating layer, protecting the inner resin layer and the corrugated tubing. FIG. 9A(3) shows the extent of vaporization. In FIG. 9A(4), a portion of the inner resin layer is removed to demonstrate that although the corrugated tubing is slightly deformed, the corrugated tubing is still intact.

FIG. 9B depicts Sample B, which catastrophically failed and was completely separated into two pieces.

Sealing Devices for Energy Dissipative Tubing

Figure 10:
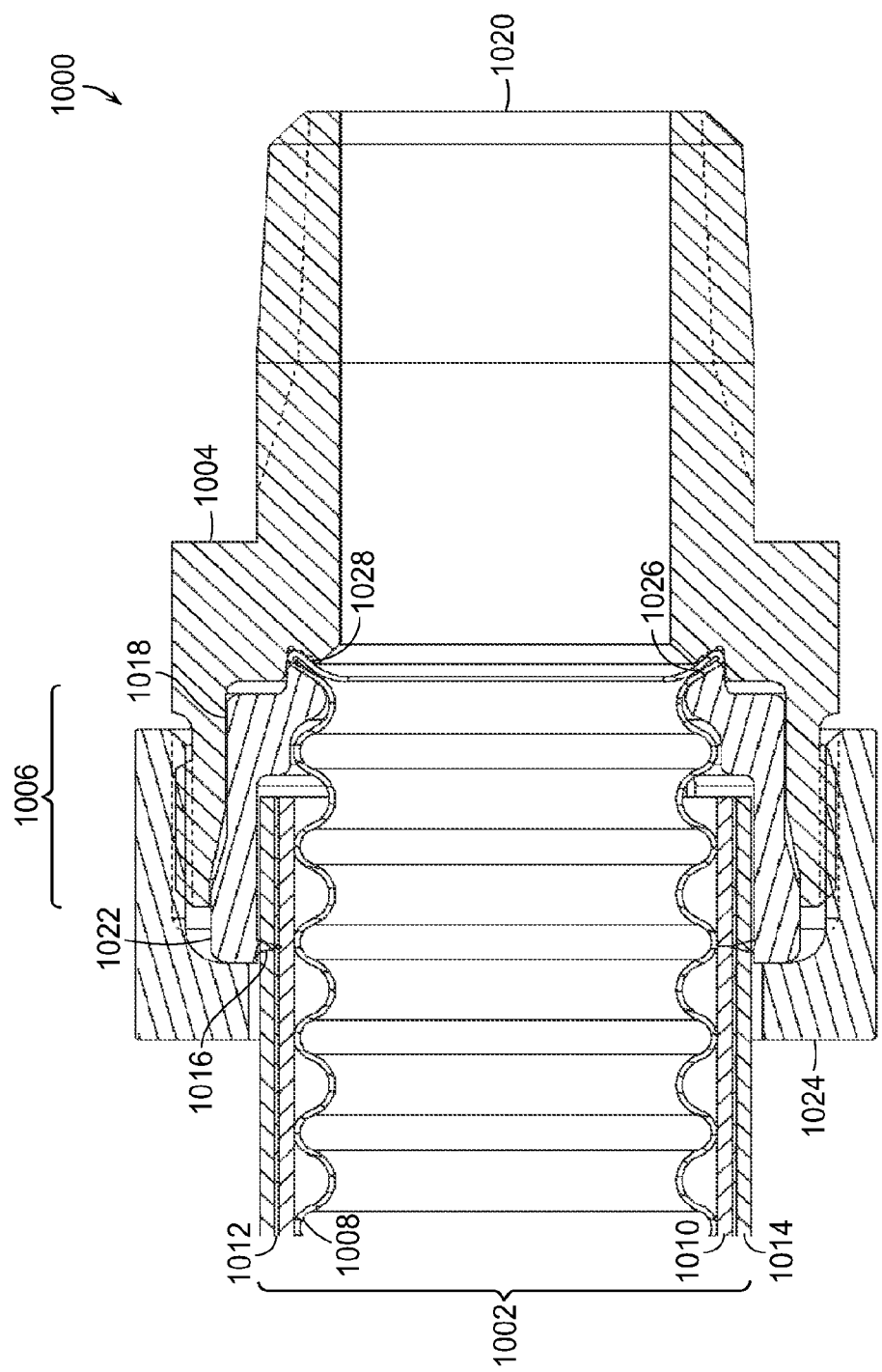
FIG. 10 depicts a sealing device according to a preferred embodiment of the subject invention.

Referring now to FIG. 10, a sealing device 1000 is provided for energy dissipative tubing 1002. The sealing device 1000 can include a body (or adapter) 1004 including a sleeve portion 1006.

The energy dissipative tubing 1002 can be any tubing configured to dissipate electrical energy. Various examples of energy dissipative tubing 1002 are described herein. In one example depicted in FIG. 10, the energy dissipative tubing 1002 includes a length of tubing 1008 (e.g., corrugated stainless steel tubing), a first resin layer 1010 adjacent to the tubing 1008, a conductive layer 1012 adjacent to the first resin layer 1010, and a second resin layer 1014 adjacent to the conductive layer 1012.

The sealing device 1000 includes one or more penetrating members 1016 configured to penetrate the second (or exterior) resin layer 1014 and establish electrical continuity with the conductive layer 1012. One of ordinary skill in the art will appreciate that the term "penetrate" encompasses situations in which the penetrating member 1016 does not completely pierce the second resin layer 1014, but does penetrate the second resin layer 1014 sufficiently so that electrical continuity is established across the partially-penetrated second resin layer 1014.

Penetrating members 1016 can be arranged in a variety of configurations. In one embodiment, the penetrating members 1016 can be one or more teeth. In another embodiment depicted in FIG. 10, the penetrating members can be a protrusion arranged on a split bushing 1018. The penetrating members 1016 disclosed in the embodiment of FIG. 10 provide a plurality of cutting surfaces as further described in the context of FIGS. 11A and 11B.

Figure 11A:
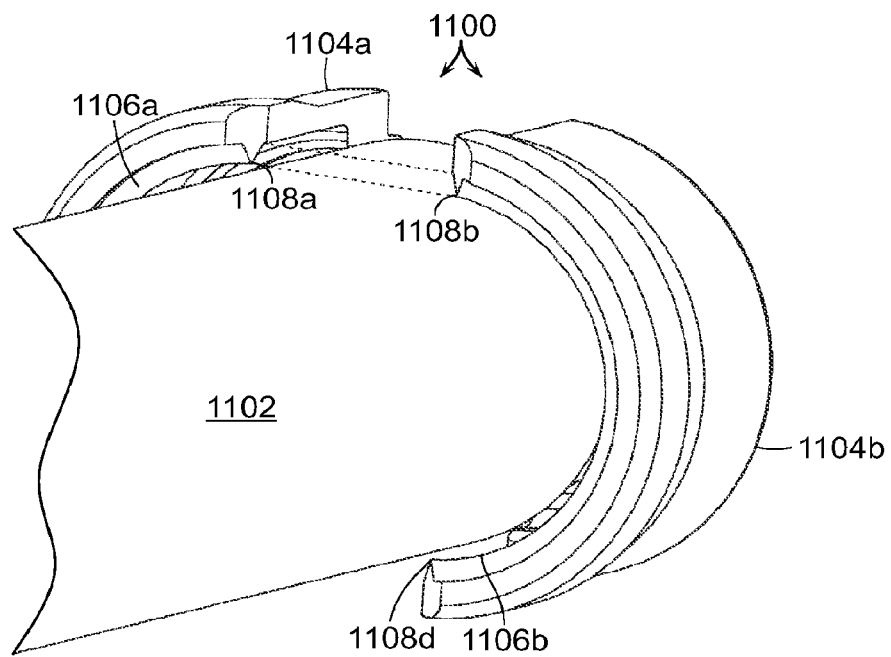
FIGS. 11A and 11B depict a split bushing useful in the sealing device of FIG. 10.

FIG. 11A depicts an exploded view of a split bushing 1100 around tubing 1102. The split bushing 1100 includes one or more components 1104 (e.g., two 180° sectors). One or more of the bushing components 1104 can include a penetrating member 1106 configured to penetrate one or more layers of the energy dissipative tubing 1102. For example, components 1104a and 1104b include circumferential penetrating members 1106a and 1106b, respectively. Although the penetrating members 1106a, 1106b extend continuously around the inner surface of the components 1104a, 1104b, the penetrating members 1106 can, in other embodiments, be discontinuous. For example, one or more penetrating members (e.g., teeth or the like) can be provided at a regular or irregular interval on the inner surface of the components 1104.

As depicted in FIGS. 10 and 11A, the split bushing 1018, 1100 described herein is particularly advantageous because it is arranged to penetrate one or more layers of the energy dissipative tubing in two directions, thereby providing more robust and predictable electrical continuity with the conductive layer 1012. As split bushing components 1104a, 1104b are compressed (i.e., pushed together), the penetrating member 1106 presses radially against the second resin layer 1014 to substantially uniformly penetrate the second resin layer 1014. At the same time, the ends 1108 of the penetrating members 1106 cut substantially tangentially across the second resin layer to establish further electrical continuity with the conductive layer 1012. The tangential cutting path is illustrated by dashed lines in FIG. 11A.

The split bushing 1018, 1100 and the penetrating members 1106 can be configured to penetrate certain layers of energy dissipative tubing 1002 and can be further optimized to reflect the specific thicknesses and materials of various embodiments of energy dissipative tubing 1002 and to withstand certain levels of electrical and/or thermal energy. In some embodiments, the penetrating members 1106 can be configured to penetrate only the second (or exterior) resin layer 1014. In other embodiments, the penetrating members 1106 can penetrate the second (or exterior) resin layer 1014, and partially or fully penetrate the conductive layer 1012 in order to establish better electrical continuity. In still another embodiment, the penetrating member 1106 can penetrate all layers of the energy dissipative tubing 1002 including the first (or inner) resin layer 1010, and is in contact or in proximity to the tubing 1008 to form electrical continuity with the tubing 1008 in addition to conductive layer 1012. Alternatively or additionally, electrical continuity can be established with the tubing 1008 through a metallic sealing face 1028.

Figure 11B:
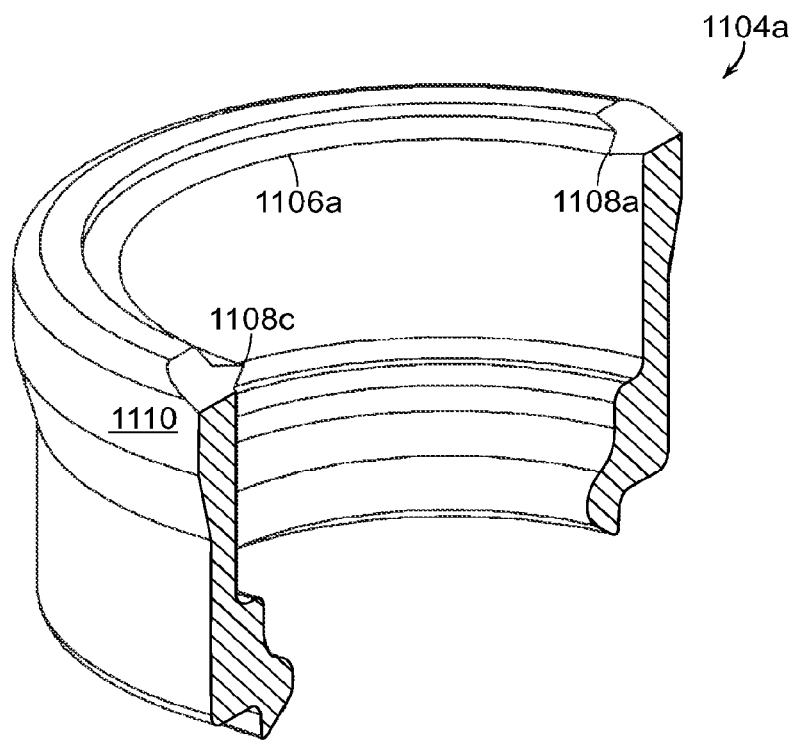

The penetrating members 1016, 1106 can be beveled and/or sharpened to better penetrate the desired layers 1010, 1012, 1014. For example, the penetrating members 1016, 1106 can be triangular-shaped protrusions as depicted in FIGS. 10-11B.

Referring again to FIG. 10, the split bushing 1018 and the sleeve portion 1006 can be configured to compress the split bushing 1018 as the split bushing is advanced towards a proximal end 1020 of the sealing device 1000. For example, the split bushing 1018 can include an enlarged diameter region 1022, 1110 configured to interact with a tapered interior of sleeve portion 1006 to provide substantially uniform compression of split bushing 1018 as the split bushing is advanced proximally.

The split bushing 1018 can be advanced proximally through a variety of techniques and components. For example, the split bushing 1018 can be engaged by a tool and advanced proximally until the split bushing 1018 is held within the sleeve portion 1006 by friction, locking members, and/or retention members as described in International Publication No. WO 2008/150449. In another embodiment, as depicted in FIG. 10, an exterior of the sleeve portion 1006 can be threaded in order to mate with a nut 1024. As the nut 1024 is tightened, the split bushing 1018 is advanced proximally to compress the split bushing 1018.

In certain embodiments, the split bushing 1018 also forms a seal between the tubing 1008 and the sealing device 1000. Such a seal can be a metal-to-metal seal formed by collapsing and compressing a first corrugation 1026 against a sealing face 1028. The principles and various embodiments of such sealing devices are described in publications such as International Publication Nos. WO 2008/150449 and WO 2008/150469, which are incorporated by reference herein.

The features and principles of operation of the split bushing 1018 can also be applied to various other mechanical devices such as multi-segment bushings, collets, split rings, and the like.

A proximal end 1020 can be configured for coupling with various fittings, pipes (e.g., black iron pipe), appliances and the like. For example, the proximal end 1020 can include male or female threads, for example in accordance with the American National Standard Taper Pipe Thread (NPT) standard, which is discussed, for example, at Erik Oberg et al., *Machinery's Handbook* 1861-65 (28th ed. 2008). In another example, the proximal end is sized for a sweat/solder connection or a compression connection. In still another embodiment, the sealing device is configured to couple two lengths of the energy dissipative tubing 1002 having the sleeve portions 1006 on both ends for receiving the split bushings 1006 and the energy dissipative tubing 1002.

The sealing device 1000, split bushing 1018, and/or nut 1024 can be fabricated from materials such as metals (e.g., iron, copper, aluminum, gold, silver, and the like), metal alloys (e.g., brass, bronze, steel, and the like), plastics, polymers, elastomers, and the like. Preferably the sealing device 1000, split bushing 1018, and/or nut 1024 are fabricated from conductive materials in order to provide a conductive path between the energy dissipative tubing 1002 to a grounding conductor (e.g., a fitting, a pipe, an appliance, a grounding wire, and the like).

The sealing devices described herein can be attached in the field or in a factory.

Although preferred embodiments of the invention have been described using specific terms, such description is for illustrative purposes only, and it is to be understood that changes and variations may be made without departing from the spirit or scope of the following claims.

Methods of Installing Energy Dissipative Tubing

Figure 12:
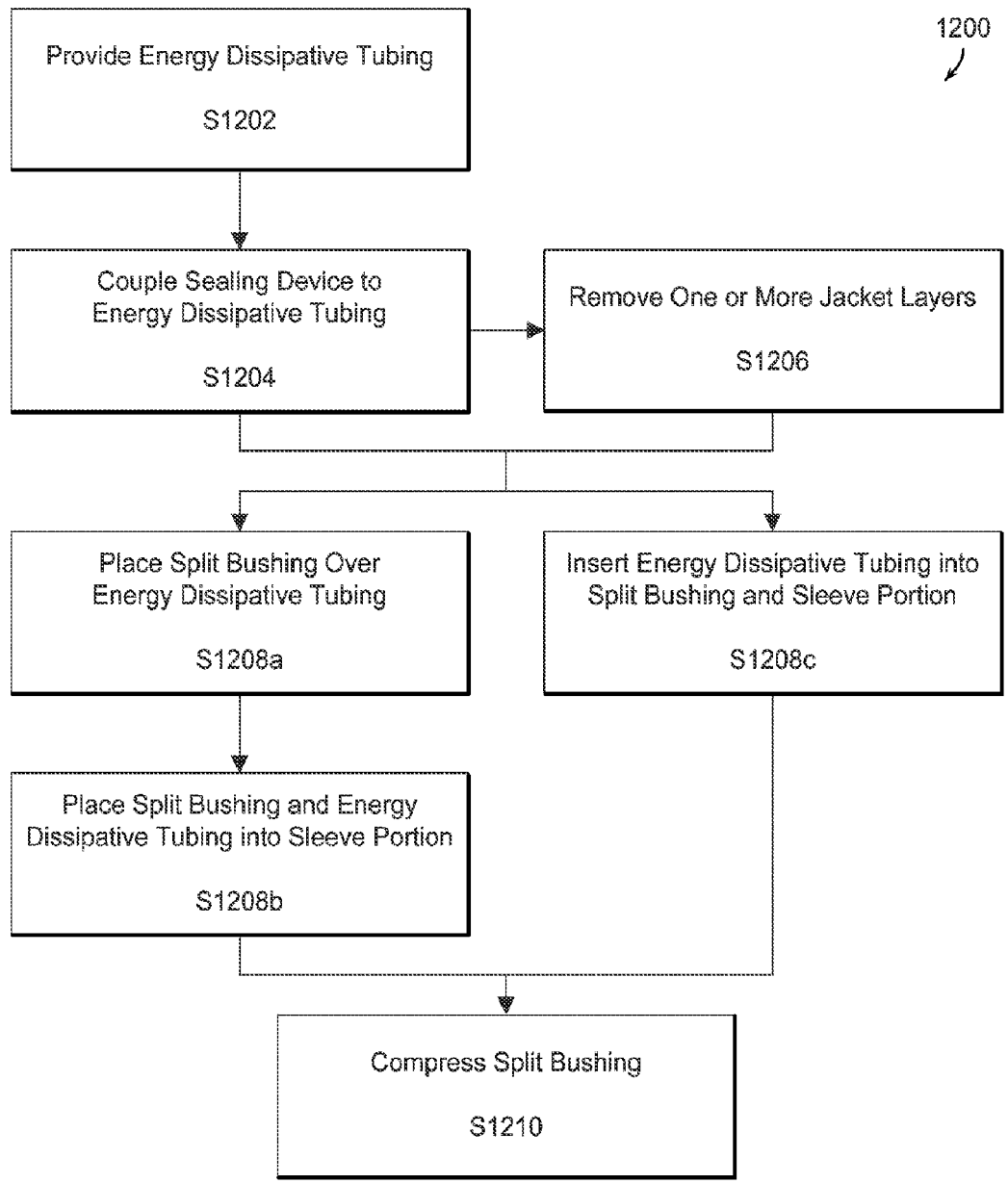
FIG. 12 depicts a method of installing energy dissipative tubing in accordance with the subject invention.
Figure 13:
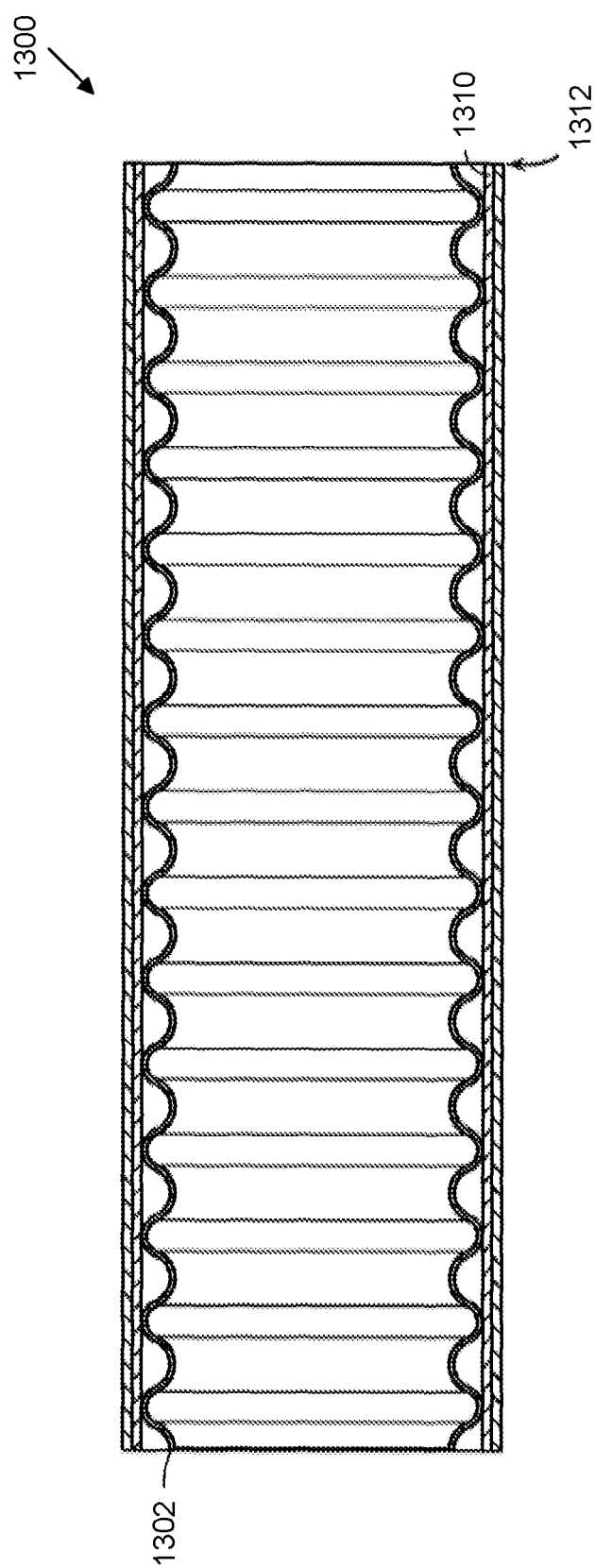
FIG. 13 depicts a cross-section of an energy dissipative tube 1300 in accordance with preferred embodiments of the invention. The tube 1300 includes a length of corrugated stainless steel tubing 1302, a conductive resin layer 1310 adjacent to the outside of the tubing, and an insulative resin layer 1312 adjacent to the conductive resin layer 1310 without a metallic layer interposed between the conductive resin layer 1310 and the insulative resin layer 1312.

Referring now to FIG. 12, a method 1200 of installing energy dissipative tubing is provided.

In step S1202, a length of energy dissipative tubing is provided. The energy dissipative tubing can be the same or similar to the energy dissipative tubing described herein. For example, the energy dissipative tubing can include a length of tubing (e.g., corrugated stainless steel tubing), a first resin layer adjacent to the tubing, a conductive layer adjacent to the first resin layer, and a second resin layer adjacent to the conductive layer.

In step S1204, a sealing device is coupled to the end of the energy dissipative tubing. The sealing device can include one or more penetrating members configured to penetrate the second resin layer and establish electrical continuity with the conductive layer.

The coupling step S1204 can include a variety of substeps. For example, in step S1206, one or more jacket layers can be removed (e.g., with a utility knife, a razor blade, a tubing cutter, and the like) to expose one or more corrugations.

In step S1208a, a split bushing can be placed over the energy dissipative tubing. The split bushing can be provided within a sleeve portion of the sealing device and removed by the installer or can be provided outside of the sealing device. The assembled tubing and split bushing can then be inserted into a sleeve portion of the sealing device in step S1208b.

Alternatively in step S1208c, the energy dissipative tubing is inserted into the split bushing without removing the split bushing from the sealing device.

In step S1210, the split bushing is compressed. The split bushing can be compressed as it is proximally advanced within the sleeve portion as discussed herein. As further discussed herein, the split bushing can be advanced through the use of a tool or by tightening of a nut.

INCORPORATION BY REFERENCE

The entire contents of all patents, published patent applications, and other references cited herein are hereby expressly incorporated herein in their entireties by reference.

The invention claimed is:

1. An energy dissipative tube consisting essentially of:
a length of corrugated stainless steel tubing;
a conductive resin layer adjacent to the outside of the tubing; and
an insulative resin layer adjacent to the conductive layer without a metallic layer interposed between the conductive resin layer and the insulative resin layer.

2. The energy dissipative tube of claim 1, wherein the conductive resin has a volume resistivity of less than about $10^6$ ohm-cm.

3. The energy dissipative tube of claim 1, wherein the conductive resin layer has a thickness between about 0.015" and about 0.035".

4. The energy dissipative tube of claim 1, wherein the insulative resin layer has a thickness between about 0.015" and about 0.035".

5. The energy dissipative tube of claim 1, wherein the conductive resin layer is a resin impregnated with a conductive material.

6. The energy dissipative tube of claim 1, wherein the conductive material is metallic particles.

7. The energy dissipative tube of claim 6, wherein the metallic particles are copper particles.

8. The energy dissipative tube of claim 6, wherein the metallic particles are aluminum particles.

9. The energy dissipative tube of claim 6, wherein the metallic particles are gold particles.

10. The energy dissipative tube of claim 6, wherein the metallic particles are silver particles.

11. The energy dissipative tube of claim 6, wherein the metallic particles are nickel particles.

12. The energy dissipative tube of claim 1, wherein the conductive material is carbon black.

13. The energy dissipative tube of claim 1, wherein the conductive material is carbon fibers.

14. The energy dissipative tube of claim 1, wherein the conductive resin is a thermoplastic polymer.

15. The energy dissipative tube of claim 1, wherein the insulative resin is a thermoplastic polymer.

16. An energy dissipative tube consisting essentially of:
a length of corrugated stainless steel tubing;
a conductive thermoplastic polymer layer adjacent to the outside of the tubing, the conductive thermoplastic polymer layer having a volume resistivity of less than about $10^6$ ohm-cm; and
an insulative resin layer adjacent to the conductive layer without a metallic layer interposed between the conductive resin layer and the insulative resin layer.

17. The energy dissipative tube of claim 16, wherein the conductive thermoplastic polymer layer is impregnated with carbon black.

18. An energy dissipative tube comprising:
a length of corrugated stainless steel tubing;
a conductive resin layer adjacent to the outside of the tubing; and
an insulative resin layer directly adjacent to the conductive layer.

19. The energy dissipative tube of claim 18, wherein the conductive resin layer is directly adjacent to the outside of the tubing.

* * * * *